United States Patent
Mizrakci et al.

(10) Patent No.: US 11,582,927 B1
(45) Date of Patent: Feb. 21, 2023

(54) SYSTEM AND METHOD FOR RAPIDLY GROWING A CROP

(71) Applicants: Serdar Mizrakci, New York, NY (US); Daniel Janeczko, New York, NY (US)

(72) Inventors: Serdar Mizrakci, New York, NY (US); Daniel Janeczko, New York, NY (US)

(*) Notice: Subject to any disclaimer, the term of this patent is extended or adjusted under 35 U.S.C. 154(b) by 803 days.

(21) Appl. No.: 16/169,423

(22) Filed: Oct. 24, 2018

Related U.S. Application Data

(60) Provisional application No. 62/668,497, filed on May 8, 2018, provisional application No. 62/610,611, filed on Dec. 27, 2017.

(51) Int. Cl.
| | |
|---|---|
| *A01G 31/06* | (2006.01) |
| *A01G 9/20* | (2006.01) |
| *A01G 9/14* | (2006.01) |
| *A01G 31/00* | (2018.01) |

(52) U.S. Cl.
CPC ............. *A01G 31/06* (2013.01); *A01G 9/143* (2013.01); *A01G 9/20* (2013.01); *A01G 2031/006* (2013.01)

(58) Field of Classification Search
USPC ................................... 47/59 R–63
See application file for complete search history.

(56) References Cited

U.S. PATENT DOCUMENTS

| | | | | |
|---|---|---|---|---|
| 4,037,360 A | * | 7/1977 | Farnsworth | A01G 31/02 47/63 |
| 4,312,152 A | * | 1/1982 | Drury | A01G 31/02 47/63 |
| 4,607,454 A | * | 8/1986 | Koike | A01G 24/48 47/63 |
| 5,818,734 A | | 10/1998 | Albright | |
| 7,184,846 B2 | | 2/2007 | Albright et al. | |
| 7,502,655 B2 | | 3/2009 | Albright et al. | |
| 9,807,950 B2 | | 11/2017 | Day | |
| 2008/0120903 A1 | * | 5/2008 | Fair | A01G 9/045 47/65.7 |
| 2012/0090236 A1 | * | 4/2012 | Orr | A01G 31/02 47/62 A |
| 2016/0135396 A1 | | 5/2016 | Day | |
| 2016/0360715 A1 | * | 12/2016 | Sherlock | A01G 33/00 |

(Continued)

FOREIGN PATENT DOCUMENTS

JP  2008-154505  * 7/2008 ............ Y02P 60/216

OTHER PUBLICATIONS

Dr. Melissa Brechner and Dr. David de Villars, "Cornell Controlled Environment Agriculture—Hydroponic Spinach Production Handbook", Cornell University CEA Program, 2013, 26 pages.*

(Continued)

*Primary Examiner* — Andrea M Valenti
(74) *Attorney, Agent, or Firm* — Finnegan, Henderson, Farabow, Garrett & Dunner LLP

(57) ABSTRACT

A method together with enabling apparatuses is disclosed for the rapid controlled growth of vegetable and similar crops in a hydroponic system. The method includes control of light, minimization of exposure to pathogens, control of temperature of ambient air and the water in the system, nutrients, pH and other growth factors such as transfer between ponds as well as specially designed floating flats and related devices.

18 Claims, 21 Drawing Sheets

(56) References Cited

U.S. PATENT DOCUMENTS

2018/0271041 A1* 9/2018 Lovas .................... A01G 31/02

OTHER PUBLICATIONS

Seed Starting: Why and How to Get Your Planting Started Indoors, by Amy Pennington, Food52, Mar. 21, 2012 [retrieved from internet on Sep. 15, 2021 https://food52.com/blog/3059-seed-starting-why-and-how-to-get-your-planting-started-indoors] 9 pages.*

Thinning Vegetable Seedlings, By Beth Bolles, Dec. 24, 2013, UF/IFAS Extension Escambia County, [retrieved from internet Feb. 22, 2022, https://blogs.ifas.ufl.edu/escambiaco/2013/12/24/thinning-vegetable-seedlings/] 3 pages.*

A. J. Both, L. D. Albright and R. W. Ianghans Coordinated Management of Daily Par Integral and Carbon Dioxide for Hydroponic Lettuce Production Crop. Models in Protected Cultivation, Ed. L.F.M. Marcelis, Acta Hort. 456 ISHS 1998.

Dr. Melissa Brechner and Dr. David de Villars "Cornell Controlled Environment Agriculture—Hydroponic Spinach Production Handbook" © Cornell University CEA Program, 2013.

Qian Li and Chieri Kubota "Effects of supplemental light quality on growth and phytochemicals of baby leaf lettuce" Environmental and Experimental Botany 67 (2000) 59-64.

Myung-Jin Lee, So-Young Park and Myung-Min Oh "Growth and Cell Division of Lettuce Plants under Various Ratios of Red to Far-red Light-emitting Diodes" Hort. Environ. Biotechnol. 56(2):186-194. 2015.

Xiao-Li Chena, Xu-Zhang Xuea, Wen-Zhong Guoa, Li-Chun Wanga, and Xiao-Jun Qiao "Growth and nutritional properties of lettuce affected by mixedirradiation of white and supplemental light provided bylight-emitting diode" Scientia Horticulturae 200 (2016) 111-118.

The Lighting Research Center at Rensselaer Polytechnic Institute Illumination for Plant Health (IPH) Program at the Lighting Research Center http://www.lrc.rpi.edu/programs/plants/plants_home.html © 2017 Rensselaer Polytechnic Institute, Troy, NY 12180 USA—All rights reserved.

Jaimin Pate. "LED has potential to end use of pesticides in farming" Netherlands—May 23, 2017—LUX Review.

Timothy James Shelford The Risk of Pythium Aphanidermatum in Hydroponic Baby-Leaf Spinach Production May 2010—A Dissertation Presented to the Faculty of the Graduate School of Cornell University In Partial Fulfillment of the Requirements for the Degree of Doctor of Philosophy This document has been split into five parts to meet the electronic file size limitations of the EFS-Web filing system.

William Reinhardt, Louis D. Albright, David S. de Villiers, Robert W. Langhans, Timothy J. Shelford, and Corrine R. Rutzke "Root Disease Treatment Methods for Commercial Production of Hydroponic Spinach" Final Report Prepared for the New York State Energy Research and Development Authority by Cornell University Department of Biological and Environmental Engineering—Feb. 2007.

* cited by examiner

| Stock A | |
|---|---|
| These chemicals are added to 300 L of RO water | |
| Calcium Nitrate | 29160.0 g |
| Potassium Nitrate | 6132.0 g |
| Ammonium Nitrate | 840.0 g |
| Sprint 330 Iron - DTPA (10% Iron) | 562.0 g |

*FIG. 12*

| Stock B | |
|---|---|
| These chemicals are added to 300 L of RO water | |
| Potassium Nitrate | 20378.0 g |
| Monopotassium Phosphate | 8160.0 g |
| Potassium Sulfate | 655.0 g |
| Magnesium Sulfate | 7380.0 g |
| Manganese Sulfate*$H_2O$ (25% Mn) | 25.6 g |
| Zinc Sulfate*$H_2O$ (35% Zn) | 34.4 g |
| Boric Acid (17.5% B) | 55.8 g |
| Copper Sulfate*$5H_2O$ (25% Cu) | 5.6 g |
| Sodium Molybdate*$2H_2O$ (39% Mo) | 3.6 g |

*FIG. 13*

| Macro-nutrients: | | | Micro-nutrients: | | |
|---|---|---|---|---|---|
| N | 8.9 Millimol $l^{-1}$ | (125 ppm) | Fe | 16.8 Micromol $l^{-1}$ | (0.94 ppm) |
| P | 1.0 Millimol $l^{-1}$ | (31 ppm) | Mn | 2.5 Micromol $l^{-1}$ | (0.14 ppm) |
| K | 5.5 Millimol $l^{-1}$ | (215 ppm) | B | 15.0 Micromol $l^{-1}$ | (0.16 ppm) |
| Ca | 2.1 Millimol $l^{-1}$ | (84 ppm) | Cu | 0.4 Micromol $l^{-1}$ | (0.03 ppm) |
| Mg | 1.0 Millimol $l^{-1}$ | (24 ppm) | Zn | 2.0 Micromol $l^{-1}$ | (0.13 ppm) |
| S | 1.1 Millimol $l^{-1}$ | (35 ppm) | Mo | 0.3 Micromol $l^{-1}$ | (0.03 ppm) |

*FIG. 14*

Input Parameters to Determine Supplemental Light Fixture Output Intensity and Spectrum:

- Intensity of natural light inside greenhouse

- DLI goal and tolerance

- Amount of light received that day/since the beginning of the crop cycle

- Cultivare

- Expected natural light

- Spectral ratios received over crop cycle

- Age of flats in grow area

- Temp, humidity, $[CO_2]$

- Optimal shelf life/taste

Supplemental Light Algorithm

↓

Light Fixture Output

*FIG. 15*

171 — Determining photosynthetic photon flux density (PPFD) in moles of photons per meter squared per second (mol m-2 s-1) available from ambient day light to a growing crop on a real time basis during daylight hours

172 — Providing supplemental light with artificial lights so that the crop receives 17mol per day or more between natural and artificial light

173 — Shifting the PPFD spectrum of the artificial light source towards the red end of the PPFD spectrum during the first 70% of the crop growth cycle

174 — Shifting the PPFD spectrum of the artificial PPFD source toward the blue end of the PPFD spectrum during the last 30% of the crop growth cycle

175 — Maintaining $CO_2$ levels in the ambient air available to the growing crop at up to 1600 ppm during day light hours

176 — Reducing $CO_2$ levels in the ambient air available to the growing crop at approximately 400 ppm during night hours

*FIG. 16*

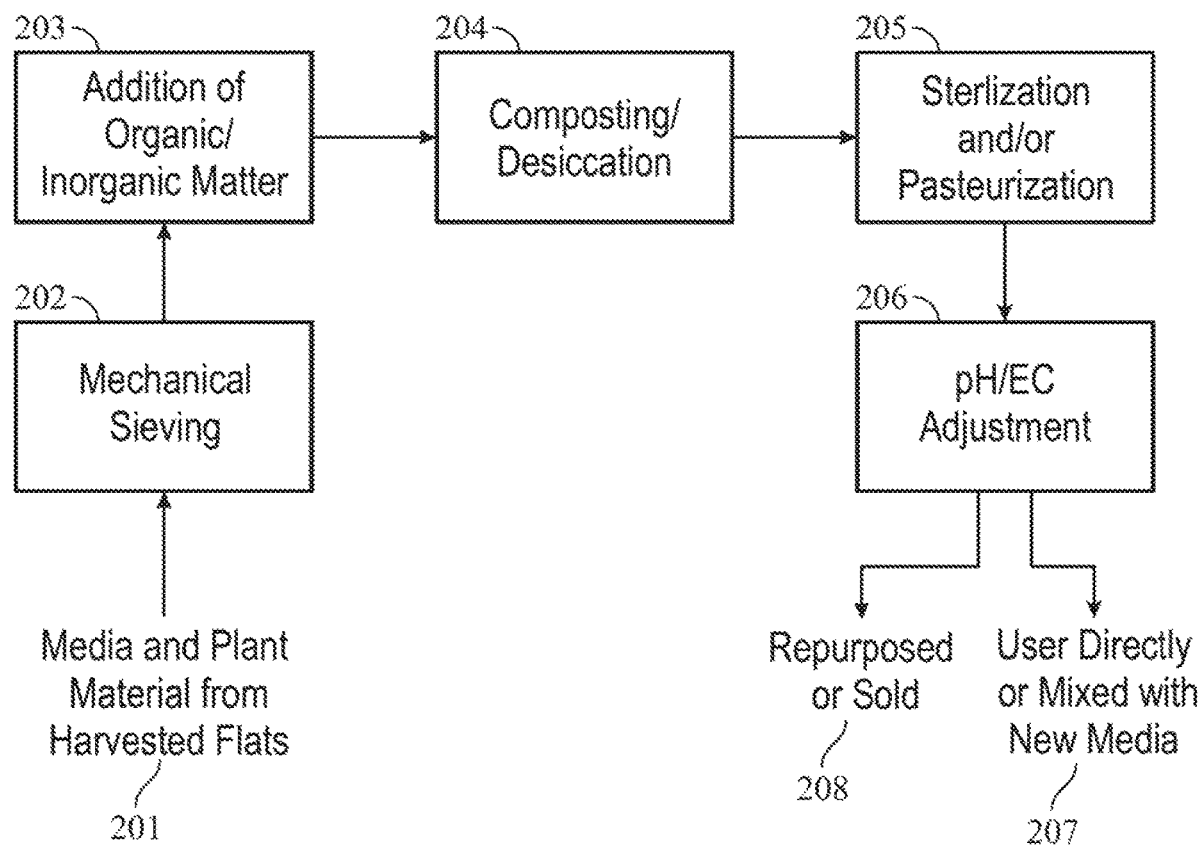

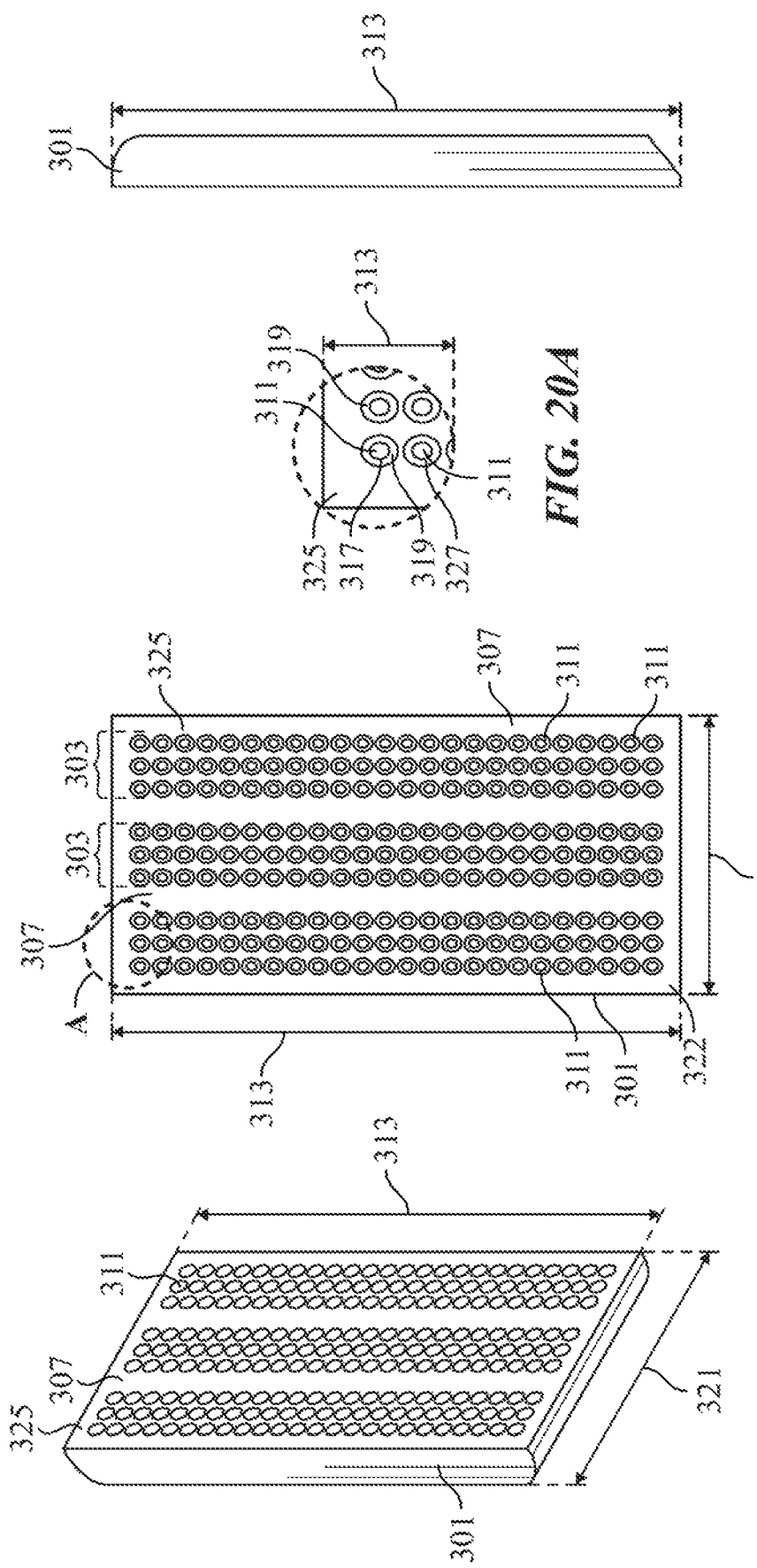

SYSTEM AND METHOD FOR RAPIDLY GROWING A CROP

CROSS-REFERENCE TO RELATED APPLICATIONS

This application claims the benefit of priority under applicable US laws of U.S. Provisional Application Ser. No. 62/610,611 filed on Dec. 27, 2017 for "A System and Method for Rapidly Growing a Crop" and U.S. Provisional Application Ser. No. 62/668,497 filed on May 8, 2018 for "A System and Method for Rapidly Growing a Crop" the content of which is relied upon and incorporated herein by reference in their entirety.

TECHNICAL FIELD

The present disclosure is in the field of Agriculture. More particularly, this application relates to a hydroponic method for rapidly growing a vegetable crop.

BACKGROUND

Hydroculture and its subset hydroponics has been a rapidly growing system for growing corps using mineral nutrient solutions in water as a solvent. It is typically done in a green house or similar structure to provide a controlled environment. It can be done anywhere in the country and at any time during the year.

Hydroculture technology has improved dramatically in the last decade to the point where it is becoming economical to produce vegetable crops such as spinach and other green leaf and root vegetables in the Northeast even during the winter. In fact, the quality is as good as or better than that grown in California's Central Valley and other traditional agriculture areas in the southwest of the United States. There are numerous sources describing the techniques of hydroculture and hydroponics. One excellent source is the "Cornell Controlled Environment Agriculture Hydroponic Spinach Production Hand Book", M. Brechner and D. de Villars© Cornell University CEA Program, 2013. Another background source on hydroponics to include would be this book: Resh, H. M. Hydroponic Food Production: A Definitive Guidebook for the Advanced Home Gardener and the Commercial Hydroponic Grower; CRC Press: Boca Raton, Fla., USA, 2012.

There are also references that provide information on light such as The Light And Shade System Implementation Algorithm both with and without integrated CO2 (Carbon Dioxide) control, termed LASSI as disclosed in U.S. Pat. Nos. 5,818,734 A 7,184,846 B2, respectively.

Additionally the following references provide information about various aspects of the systems that are applicable to the technology:

Lighting References:
"Growth and Cell Division of Lettuce Plants under Various Ratios of Red to Far-red Light-emitting Diodes" Myung-Jin Lee, So-Young Park, and Myung-Min Oh, Hort. Environ. Biotechnol. 56(2):186-194. 2015.
"Effects of supplemental light quality on growth and phytochemicals of baby leaf lettuce" by Qian Li and Chieri Kubota, Environmental and Experimental Botany 67 (2000) 59-64. [-]
Method for controlling greenhouse light—U.S. Pat. No. 5,818,734 inventor L D. Albright.
"Systems and methods for providing optimal light-CO2 combinations for plant production"—U.S. Pat. No. 7,184,846, inventors L. D. Albright, et at.
"Coordinate Management of Daily PAR Integral and Carbon Dioxide for Hydroponic Lettuce Production"—Crop. Models in Protected Cultivation, Ed. L. F. M. Marcelis, Acta Hort. 456 ISHS 1998.
Suppression of mildew pathogens using adjustable spectrum LED lighting, "LED has potential to end use of pesticides in farming" by Jaimin Pate Netherlands—23 May 2017-LUX Review. [-]
Sources on Pythium infection: THE RISK OF PYTHIUM APHANIDERMATUM IN HYDROPONIC BABY-LEAF SPINACH PRODUCTION MAY 2010—by T. J. Shelford A Dissertation Presented to the Faculty of the Graduate School of Cornell University In Partial Fulfillment of the Requirements for the Degree of Doctor of Philosophy. ROOT DISEASE TREATMENT METHODS FOR COMMERCIAL PRODUCTION OF HYDROPONIC SPINACH, Final Report Prepared for the New York State Energy Research and Development Authority by Cornell University Department of Biological and Environmental Engineering—February 2007 By W. Reinhardt. L. D. Albright, D. S. de Villers, R. W. Langhans, T. J. Shelford, and C. F. Rutzke.

While the above references provide a significant amount of information regarding hydroculture and hydroponics, there is still room for substantial improvement in the technology. These improvements include use of light, design of the flats that hold the plants, and other improvements to eliminate harmful pests, bacteria and fungi that can cause extensive damage in a hydroculture operation.

No admission is made that any reference cited herein constitutes prior art. Applicant expressly reserves the right to challenge the accuracy and pertinence of any cited documents.

SUMMARY

In order to achieve the various objectives cited above and elsewhere in the text herein the invention provides a method for rapidly growing vegetables in a controlled environment by: 1) planting a plurality of seeds in growth media, said growth media being contained in plurality of trays that float and provide access for the plants to water when floating; 2) germinating the seeds by placing the trays with planted seeds in a humid, warm and dark environment; 3) transferring the trays with germinated seeds to a production pond filled with water to thereby float the trays on the water in the production pond; 4) refreshing the water the plurality of trays are floating in while plants derived from the germinated seeds are growing in on a time cycle that is shorter than the life cycle of a potential pest; 5) providing light to the plurality of floating trays on a daily basis while the plants are growing; 6) controlling the quality of the water while the trays are floating in; and 7) harvesting the plants when they reach maturity.

In a further aspect the method the step of refreshing the water includes one or more of the following: 1) moving the trays to a new production pond; 2) moving the trays to a separate section of the production pond with segregated water, 3 replacing the water in the production pond with fresh water, and 4) refreshing the water in the production pond.

In a further aspect of the invention the step of controlling the quality of water while the trays are floating in the production pond includes the steps of: 1) withdrawing water from the production pond; 2) filtering out particulate matter; 3) filtering the water through a UV filter; 4) agitating the withdrawn water; 5) pasteurizing the withdrawn water; 6) cooling the water after pasteurization; and 7) returning the water to the production pond.

In another aspect of the invention the step of providing light comprises maintaining ambient light with a photosynthetic photon flux density of approximately 17 mol/m2/day during day light hours.

In another aspect of the invention it includes the steps of: a) maintaining ambient air temperature around the production pond at approximately 24 C during daylight hours and 19 C during night hours; b) maintaining water temperature at 20 C or less; c) maintaining co2 levels around the pond at between 400 ppm to 1600 ppm; and d) aerating the pond with air/oxygen.

In another aspect of the invention the floating trays have a matrix of cells in which the plants grow from the germinated seeds and includes the step of leaving cells around a periphery of the tray empty and leaving at least one column of cells on an interior of the tray empty.

In another variation of the invention it provides floating trays for a hydroponic system having: a) a floating tray with a matrix of cells; and b) where in each of the cells of the tray are oval shaped with the long axis of each of the cells running on a line parallel to one longitudinal direction. In another aspect of the floating trays the cells are $13/16^{th}$ of an inch on their long axis and $11/16^{th}$ of an inch on their short axis. In another aspect of the floating trays they include: a) a buffer space around the periphery of said floating tray; and b) at least one buffer space running down an interior length of said floating tray. In a further aspect of the floating trays the indluce plastics inserts that are placed in each of the cells to line each cell. In a further aspect of the floating trays the plastic inserts are attached together in the form of a matrix, said matrix of inserts being congruent with said matrix of cells in said tray such that said insets can be positioned In a corresponding cell at the sametime.

In a further aspect of the invention it includes a method for providing light and shade to optimize growth of a crop having the steps of: a) determining photosynthetic photon flux density (PPFD) In moles of photons per meter squared per second (mot m-2 s-1) available from ambient day light to a growing crop on a real time basis during daylight hours; b) providing an artificial PPFD source to maintain the overall all PPFD illumination of the growing crop of at desired levels; c) shifting the PPFD spectrum of the artificial light source towards the red end of the PPFD spectrum during the first part of the crop growth cycle; and d) shifting the PPFD spectrum of the artificial PPFD source toward the blue end of the PPFD spectrum during a second part of the crop growth cycle. In an additional aspect of the Invention the light and shade method the first part of the crop growth cycle is 70% of the crop growth cycle and the second part of the crop growth cycle is the is 30% of the growth cycle. In another variation of the light and shade method it can include the additional steps of: a) maintaining CO2 levels in the ambient air available to the growing crop at up to 1600 ppm during day light hours; and b) reducing CO2 levels in the ambient air available to the growing crop to approximately 400 ppm during night hours. In another aspect of the light and shade method it includes the step of providing an artificial PPFD source includes the step of providing an artificial light source that includes variable spectrum LEDs. In yet another aspect of the light shade method of claim it includes the step of providing an artificial PPFD source includes augmenting the LED light source with sodium vapor lights.

In another aspect of the invention it provides floating trays for a hydroponic system where each tray has: a) a matrix of cells; b) a buffer space around the periphery of said floating tray; c) at least one buffer space running down an interior length of said floating tray; and d) where in each of the cells of the tray are oval shaped with the long axis of each of the cells running on a line parallel to one longitudinal direction. In a further aspect of the floating tray the cells can in a variation be $13/16^{th}$ of an inch on their long axis and $11/16^{th}$ of an inch on their short axis.

In a further aspect of the invention it provides a method for rapidly growing vegetables in a controlled environment with the steps of: a) planting a plurality of seeds in growth media, said growth media being contained in plurality of trays that float and provide access for the plants to water when floating; b) germinating the seeds by placing the trays with planted seeds in a humid, warm and dark environment; c) transferring the trays with germinated seeds to production pond filled with water to thereby float the trays on the water in the first stage pond; d) moving the trays with growing plants to at least one more production pond during the growth cycle of the plants in the trays; e) providing light to the production ponds on a daily basis for the plants to grow; f) controlling the quality of the water while the trays are on the first stage pond and the second stage pond; and g) harvesting the plants when they reach maturity. In another aspect of this method of the invention the step of controlling the quality of water while the trays are on the first stage production pond and the second stage production pond includes the steps of: a) withdrawing water from the production pond; b) filtering out particulate matter; c) filtering the water through a UV filter; d) agitating the withdrawn water; e) pasteurizing the withdrawn water; f) cooling the water after pasteurization; and g) returning the water to the production pond. In another aspect of this method of the invention the steps of providing light includes maintaining ambient light with a photosynthetic photon flux density of approximately 17 mol/m2/day during day light hours. In a further aspect of this method of the invention. Includes the additional steps of: a) maintaining ambient air temperature around the production pond at approximately 24 C during daylight hours and 19 C during night hours; b) maintaining water temperature at 20 C or less; c) maintaining co2 levels around the pond at between 400 ppm to 1600 ppm; and d) aerating the pond with air/oxygen. In yet another variation of this method of the invention the step of moving the trays to a second production pond can be accomplished by one of the following methods: 1) moving the trays to a separate second production pond; 2) moving the trays to a separate section of the first production pond with segregated water, 3 replacing the water in the first stage production pond with fresh water, or 4) refreshing the water in the first stage production pond. In yet another aspect of the method of the invention it includes the further step of moving to at least a third production pond during the growth cycle of the crop being grown. In yet another aspect of this method of the invention it the floating trays have a matrix of cells in which the plants grow from the germinated seeds and including the step of leaving cells around a periphery of the tray empty and leaving at least one column of cells on an interior of the tray empty.

Additional features and advantages will be set forth in the detailed description which follows, and in part will be readily apparent to those skilled in the art from the description or recognized by practicing the embodiments as described in the written description and claims hereof, as well as the appended drawings:

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 12 a table of various additives used to adjust water pH and other characteristics in one variation of the present invention;

FIG. 13 another table of various additives used to adjust water pH and other characteristics in another variation of the present invention;

FIG. 14 a table of various micro and macro nutrients that can be added to the pond water in a variation of the invention;

FIG. 15 a chart of various factors considered for adjusting light output to achieve optimal crop production;

FIG. 16 a flow chart with an embodiment of a system and method for optimizing light exposure of a growing crop;

FIG. 18 a flow chart of an embodiment of a method for recycling and reusing growth media;

FIG. 19 is a raised perspective view of another embodiment of the floating tray or flat of the present invention;

FIG. 20 is a top view of the embodiment of the floating tray or flat of FIG. 19;

FIG. 20A is an enlarged view of the circled area A at the upper left corner of the tray depicted in FIG. 20;

FIG. 21 is a side view along the long side of the embodiment of the floating tray or flat of FIG. 19;

DETAILED DESCRIPTION

Figure 1:
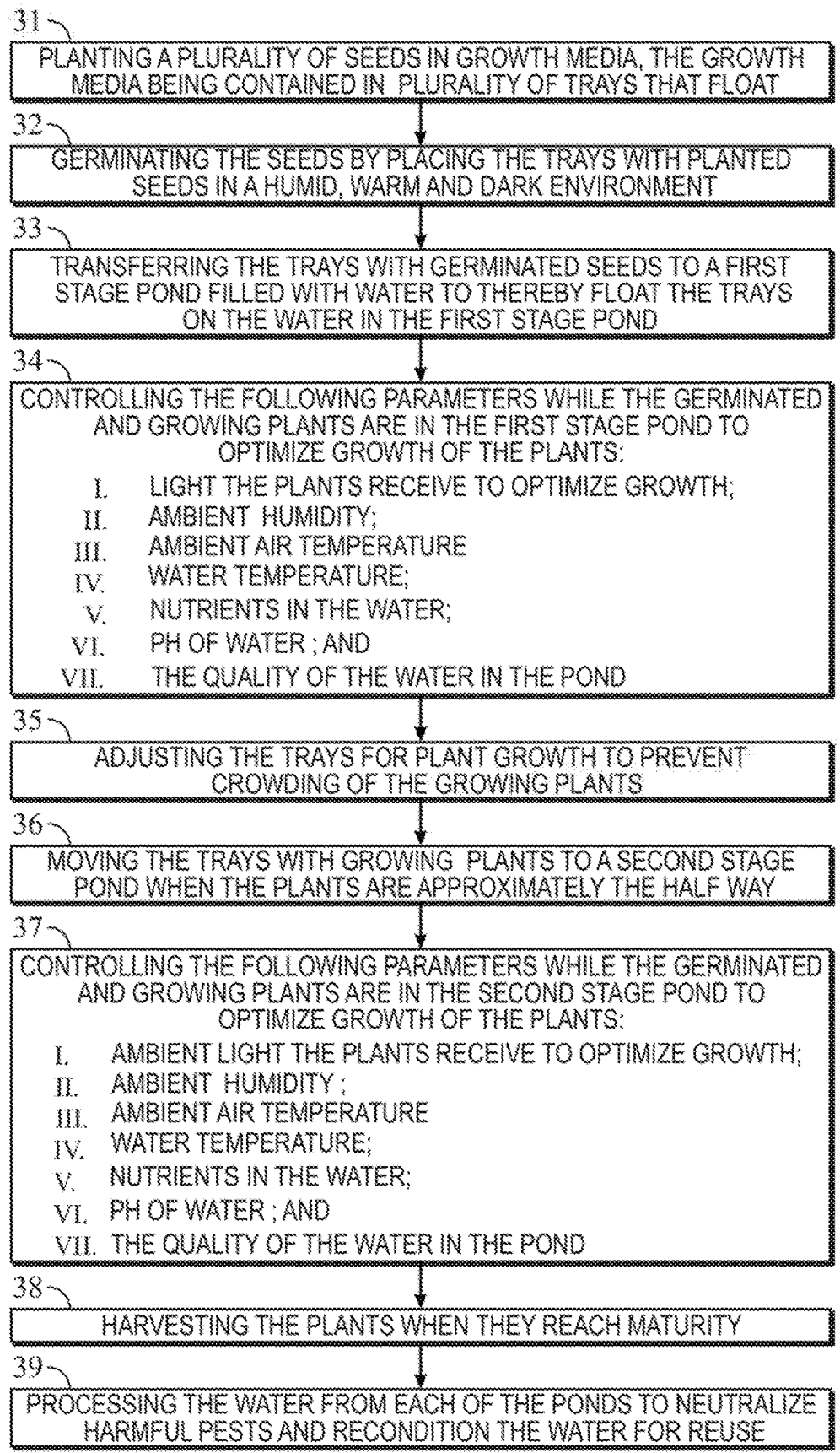
FIG. 1 is a flow chart that provides an over view of a basic embodiment of the method and system of the present invention.

FIG. 1 a flow chart provides an over view of an embodiment of the method or system of the present invention that uses hydroculture or hydroponics to grow a crop. In the embodiment of the invention described herein it uses the example of a crop of baby leaf greens such as spinach is grown. Thus, the values of the parameters used are geared towards the subject crop. However, depending on the crop or plants grown with the method and apparatus of the present invention actual days for germination of the seeds and then growth of the plants can vary significantly without departing from the concepts of the present invention.

As noted, in the embodiment described herein which uses spinach as an example the germination period is typically no more than three days with a 14 day growing period to maturity with seven days spent in a first stage production pond followed by seven days in a second stage production pond. But this can vary significantly without departing form the concepts of the invention depending on the crop or plants grown with the method and apparatus of the present invention. For example, vegetable or other crops that have a longer germination or growth period such as large leaf greens (full head lettuce, chicory, etc.) or root vegetables (carrots, radishes, beets, etc.) can be grown by adjusting the growth parameters. A number of unique and inventive innovations will be disclosed among them a multiple pond production system where the growing plants are transferred to successive production ponds on a schedule where they remain in each pond for a period less than the reproductive live cycle of pathogenic microbes that can damage or destroy the crop. An alternative as will be discussed below to using multiple production ponds will be the use of a single pond with movement between different isolated sections or refreshing the water on a periodic or constant basis. Additionally, the innovative use of the various growth factors by the present invention produces a better tasting and more palatable crop than one produced in the Central Valley of California and shipped to market.

I Planting of the Seeds

The first step is planting the seeds for the prospective crop in floating trays after appropriate substrate or growth media has been added to the trays or flats 31. A suitable growth media would be used depending on the crop and other conditions as described below. By way of example a substrate or growth media typically may, but not always consist of peat moss and vermiculite or peat moss/vermiculite/perlite either of which would be mixed with water before sowing. However, other suitable growth media can be used without departing from the invention, such as coconut coir for example.

Expanded polystyrene (EPS) foam plug trays or flats that have a matrix of growth cells are recommended to hold the growth media and seeds. In one embodiment a separate plastic jacket can first be inserted into the cells of the flats or trays that are then filled with growth media. Next the flat is dibbled, compacting the growth media to create a depression in each cell which will hold the seed. The seeds are placed in the center of the cell, covered with additional media (this step depends on the seed size—some seeds don't need another layer), then compacted again. Seeds are planted in the normal manner depending on the type of plant. Spinach seeds would typically be planted at least ½" deep so the pericarp (seed coat) is removed. On the other hand kale, mustard and arugula, which do not have seed coats, would be planted more shallowly.

Although the embodiment described herein uses expandable polystyrene foam plug trays other types of floatable trays or flats that can accomplish the same task can be used. Using floating trays is standard in the industry and there are many variations including off the shelf EPS trays from Speedling (Ruskin Fla.) and Beaver Plastics (Ontario Canada) can be used. However, these trays use more growing substrate than is necessary. As will be discussed below the present invention provides a number of improvements and alternative embodiments that provide significant improvements over what is currently available in the way of floating trays or flats.

Figure 2:
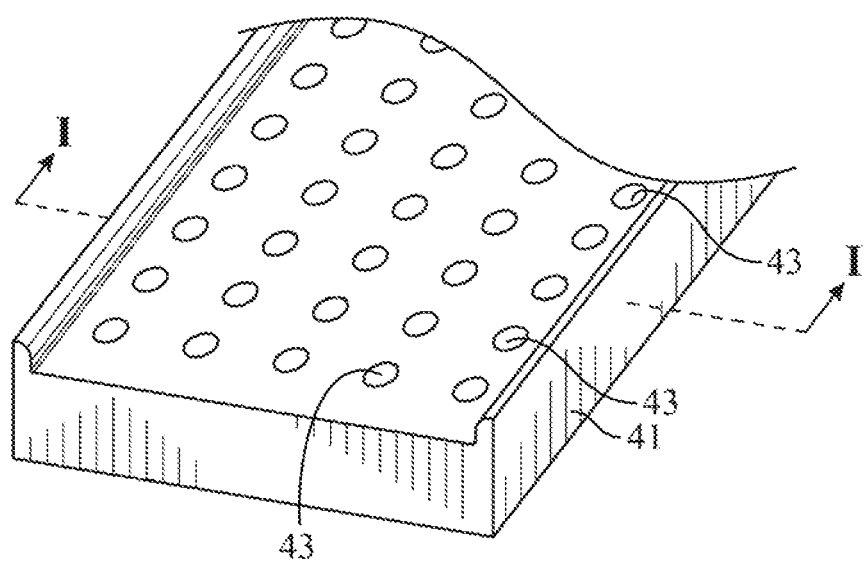
FIG. 2 depicts a portion of the floating tray or flat in which the plants are grown.
Figure 2A:
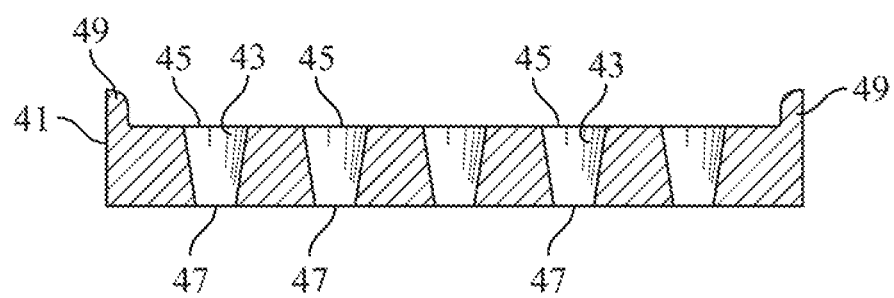
FIG. 2A a cross-sectional view along line I-I of FIG. 2.

FIG. 2 Provides a perspective view of a portion of an embodiment of a polystyrene foam plug tray 41 with improved features. Tray or flat 41 has a matrix of cells 43 in which the seeds are planted as described above after the cells are filled with growth media. Cells 43 are cone shaped sections a depicted in FIG. 2A a cross-sectional view of flat 41 along plane I-I of FIG. 2. As can be seen in FIG. 2A the top 45 of the cell 43 has a large opening and narrows down to a small opening 47 at the bottom.

Also, visible in FIGS. 2 & 2A are raised edges 49 along the length of either side of flat 41. The raised edges 49 protect the germinating plants if the flat is wrapped as part of the germinating process giving the plant room to germinate in and preventing a compacting of the growth media beyond a desired level. Additional advantages of edges 49 will be discussed below. Although FIGS. 2 and 2A depict a flat that has a matrix of cells that are 5 across. The actual number of cells across or down the length of the matrix of cells can vary without departing from the invention.

Figure 2B:
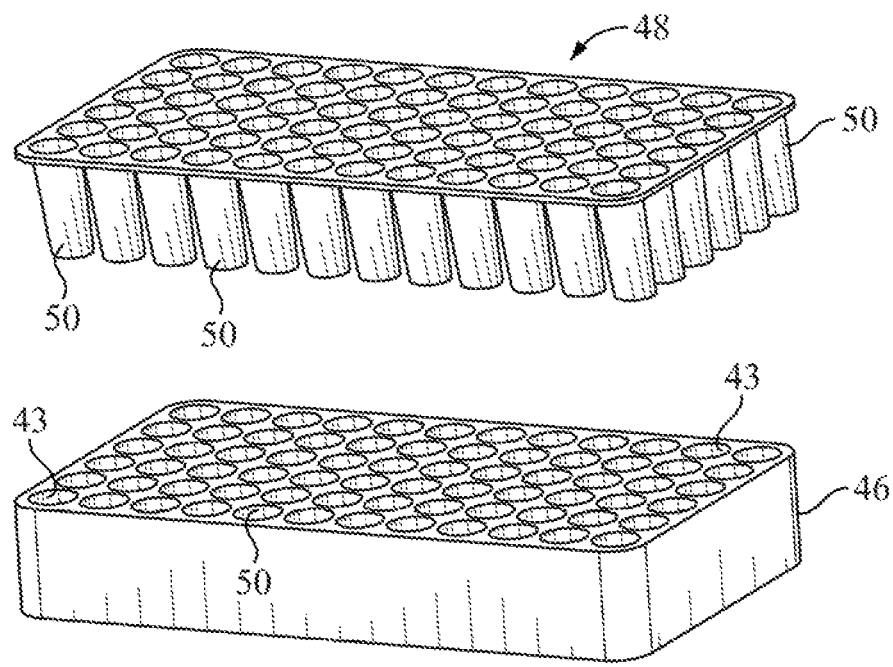
FIG. 2B shows an embodiment of inserts of the present invention and a try into which they are inserted.
Figure 2C:
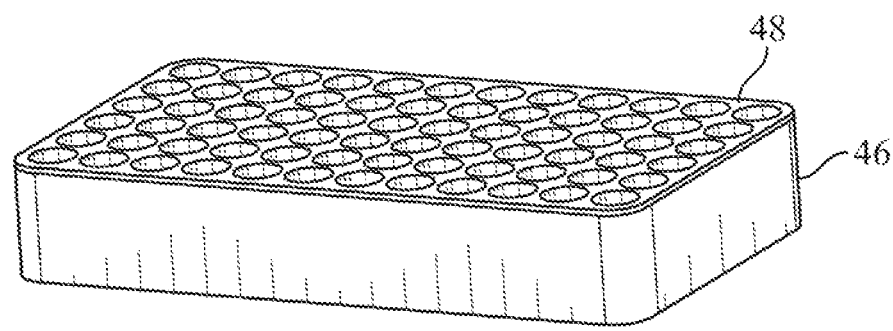
FIG. 2C depicts the inserts shown inserted into the floating tray of FIG. 2B.

In another embodiment of the floating trays or flats of the invention before the growth media is put in the cells in the tray or flats a plastic liner is placed or inserted into each of the cells. Referring to FIG. 2B a matrix of inserts 48. The individual insets 50 being cone shaped plastic liners shaped to be inserted into each cell 43 floating tray 46. FIG. 2C depicts the matrix of inserts 48 inserted into tray 46. As will be discussed below at the appropriate time the inserts in this embodiment aid in transplanting the growing plant to flats or trays that provide more room for continued growth. Each insert in each cell will have a plant growing in it, the insets can be separated and the individual insert with growing plant can be move to another floating tray with more widely spaced cells to allow the plant to continue growing and not be stunted by crowding of other adjacent plants. The conic open ended shape of the cell holds the growth media and seeds and also allows the growing plant to access water and the nutrients in the water when flat 46 is floated in a pond. Insert matrix 48 is made of plastic or any suitable similar material. The floating tray or flat 46 like the other embodiments of the floating trays described herein can be made of expanded polystyrene that is suitable sealed or any similar material that is easily formable into the appropriate shape and can provide the buoyance necessary to hold the growing plants while floating in the pond without sinking and is durable and be used multiple times.

II Germination

The next step in the process involves germination of the planted seeds step 32 of FIG. 1. Newly seeded flats will be stacked, flush or with a small gap between them, on racks/carts. A sterile, high-surface area material like perlite can be added in between layers to increase humidity in the stacks. It may also be necessary to place a thin, impenetrable film between adjacent layers to prevent the roots of the top layer's plants from growing into the cells directly below them.

As an additional variation once full, the flats or trays can be wrapped with plastic shrink wrap individually or after being stacked as described above to create an airtight seal. They'll then be wheeled into the germination chamber where the environment will be maintained at high humidity and a constant temperature (dependent on cultivar). Once seedlings are ready to be exposed to light, the carts will be removed from the germination chamber and the shrink wrap seat will be broken so flats can be removed from the racks. The length of time spent in the germination chamber is dependent on seed-imbibition, media & moisture content, temperature, and cultivar. Proper timing of removal from the germination chamber and exposure to moderate light levels reduces stretching of seedlings. Light must be provided at a low intensity soon after germination to prevent stretching of the plants. It's also possible that the flats do not need to be shrink wrapped if the germination chamber itself is of proper humidity level.

III Transfer to the First Production Pond

Once the seeds have germinated and some cotyledons are visible, usually 1.5-3 days after sowing, the flats should be floated on the first production pond step 33 FIG. 1.

Figure 3:
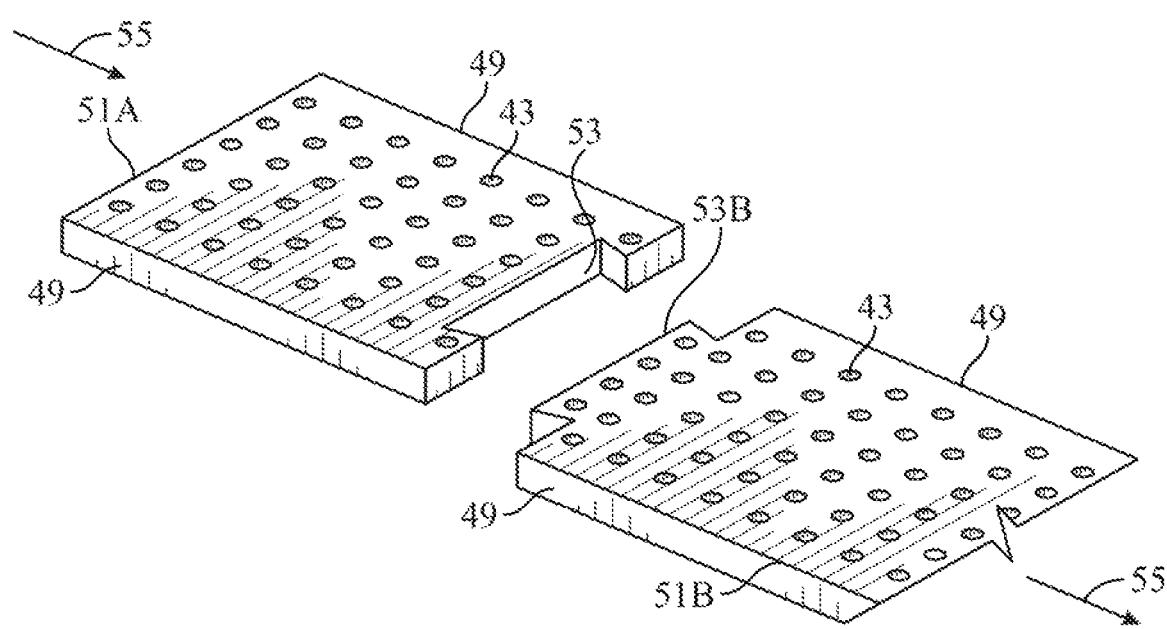
FIG. 3 depicts two floating trays and the structure that connects them.

FIG. 3 depicts two flats or trays 51A and 51B that have an Interlocking flat design with dovetail end 53A on flat 51A that connects into matching dovetail end 538 of flat 51B.

Figure 4:
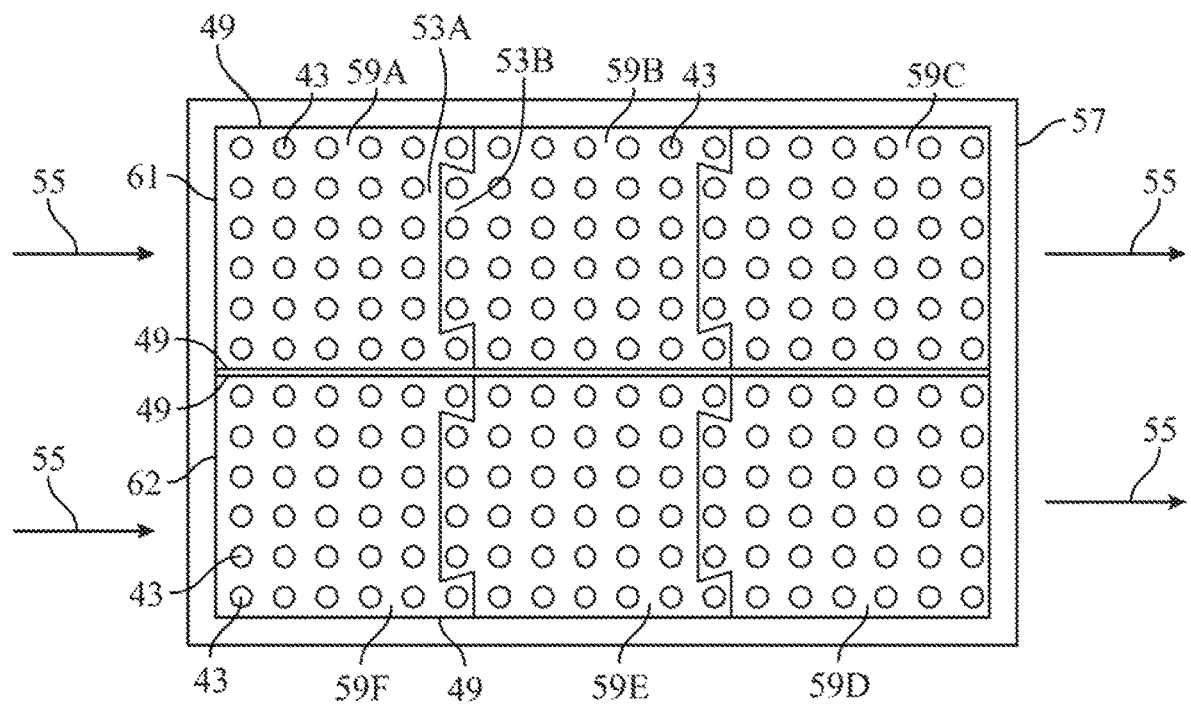
FIG. 4 is a top view of a production pond with two sets of three interlocking trays and their interconnecting structure.

Thus, in one embodiment of the invention there will be implemented interlocks between adjacent flats in at least one direction as depicted in FIG. 3 by arrow 55. Referring to FIG. 4 a view of a top of a production pond 57 with two sets of three interlocking flats 61 and 62. Set 61 is made up of flats 59A, 598 and 59C, and set 62 is made up of flats 59D, 59E and 59F. In the embodiment depicted each set 61 and 62 are in essence floating rafts. Connecting the flats into units such as 61 and 62 will simplify moving flats within the pond/and removing them for harvesting or transplanting.

Since the sets of interlocking flats can be sized to cover the entire surface of a production pond this will also reduce the light that reaches the water surface and thus inhibit algal growth/biofilm build up. In the embodiment depicted in FIGS. 3 and 4 the edge flats with no interlocking portion on one end but have flat edges to allow the floating sets or rafts of flats to be positioned flush against each other and the side edge of the pond as illustrated in FIG. 4.

The interlocking mechanism will enable tension in the direction of the symmetric axis arrow 55 FIGS. 3 and 4. This will allow flats to be moved as a unit once they are removed from the pond. For example, when fed through the harvester on a conveyor. Raised edges 49 parallel to the symmetric axis will reduce tangling of leaves between adjacent, non-interlocked rows. It will also reduce the number of edge leaves that fall into the pond water or become damaged during moving of the flats. The raised edges of the flat will also aid in guiding edge leaves inward as the flat is sent beneath the blade of the harvester.

Figure 5:
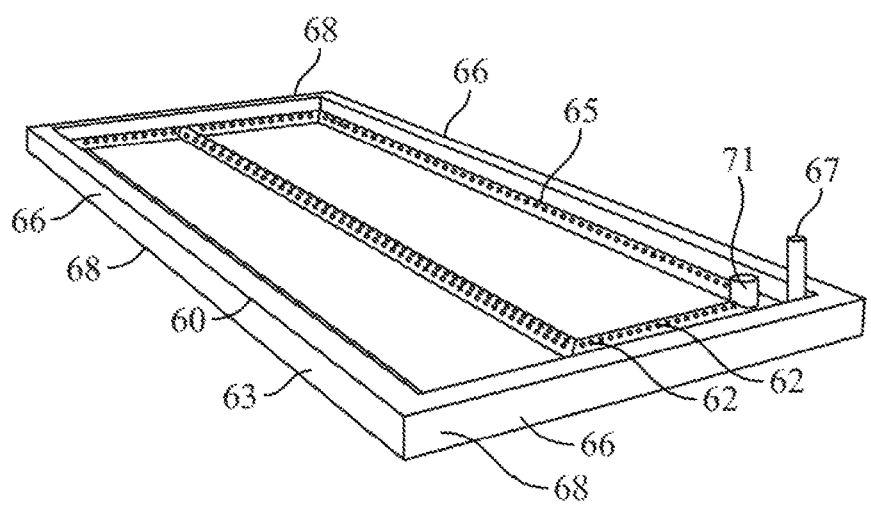
FIG. 5 is a raised perspective view of one embodiment of a production pond showing placement of the water circulating manifold.

Ponds can be built of wood, concrete, or sheet metal or alternatively sunk into the greenhouse floor to a depth of at least 10-11". When a pond liner is used care should be taken to avoid puncturing of the pond liner, which can be polyethylene (PE) plastic. FIG. 5 is a raised perspective view of an embodiment of a production pond 63 of the present invention showing an embodiment of placement the water circulation system 65.

In FIG. 5 lengths of PVC pipe 66 run the perimeter of the pond and through the center. Inlet/outlet holes 68 are drilled along the pipes and oriented such that they maximize mixing and minimize dead spots to avoid poor water circulation, as detailed in the drawings below. The system has an inlet 67 for introduction of water at one end of the length of PVC pipe and an outlet 71 at the other end.

Figure 6:
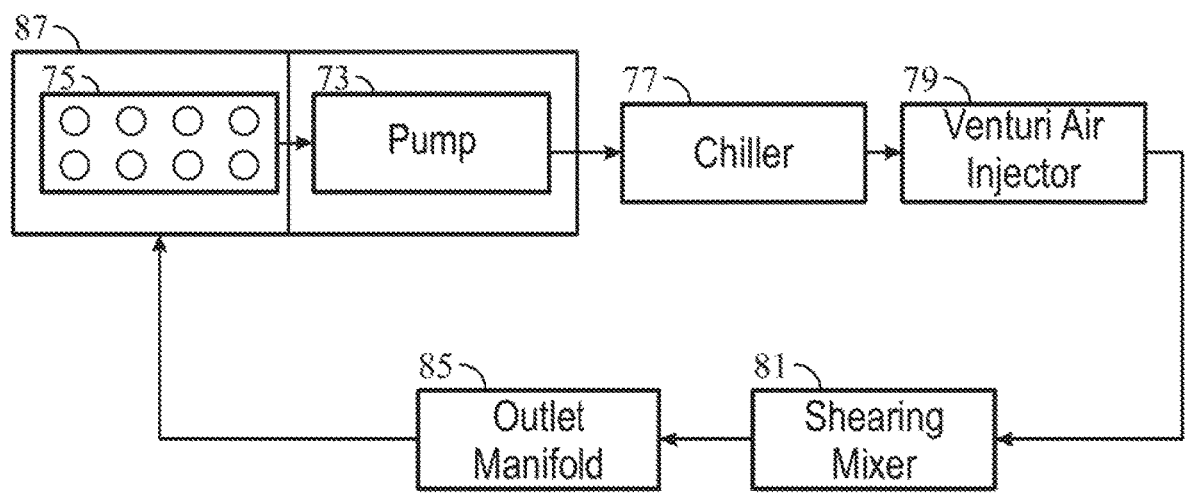
FIG. 6 is a schematic diagram of the major components of one variation of an embodiment of the water circulating and conditioning system of the present invention FIG. 7 provides a top view of a two insert flat system.

Referring to FIG. 6 a schematic diagram of one variation of an embodiment of the water circulating and conditioning system of the present invention. The system consists of pumps 73 such as a submersible or inline, which draw water through the inlet holes in the PVC manifolds 75, pump it through the chiller 77, followed by venturi air injector(s) 79, shearing mixer 81 (explained below), and finally through the outlet PVC manifold 85 back into the pond 87.

As will be discussed below at section V in detail while the growing plants are in the first production pond various growth parameters are controlled as part of step 34 FIG. 1. These include ambient light, ambient air temperature, water temperature, nutrients in the water, relative humidity of the air, pH of the water, the quality of the water, CO2 levels, and oxygen content of the water in the first production pond. In the embodiment of the invention described herein the productions ponds are in an enclosed area such as a greenhouse that allows for the control of the listed growth parameters.

At some point during the growth cycle the growing plants will begin to crowd each other out and need to be rearranged or moved to provide more room for optimal growth. One option is to transplant them to a new flat that will provide more room for growth step 35 FIG. 1. Each of the plants can be in a separate liner and the cells in the new flat would be spaced further apart to provide the extra room. Although the transfer of the plants from one pond to another may be a good opportunity to transfer the growing plants in their liner to another flat it can be done at any time deemed necessary to prevent the growing plants from being stunted in growth due to crowding. It should also be noted that by using the liners in the cells the process of cleaning and sanitizing the trays or flats is made that much easier since the liner also protects the surface of the cell from contamination from the growth media which is contained in the liner. As will be discussed below another alternative to having to move the plants to a new tray with more room are trays with modified designs that provide more room for growth without the need to transfer them to another tray during the entire growing cycle.

Figure 7:
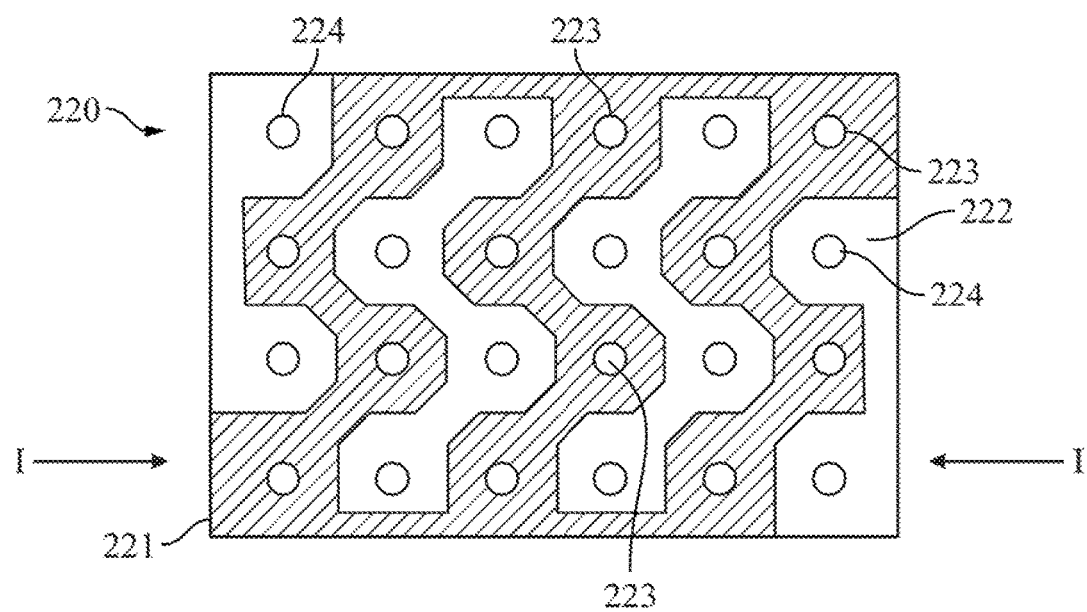
FIG. 7A is a top view of a $1^{st}$ insert of the two insert flat system.
FIG. 7B is a top view of the $2^{nd}$ insert of the two insert flat system.
FIG. 7C provides a side cross sectional view of the inserts of the two flat insert system.
Figure 7A:
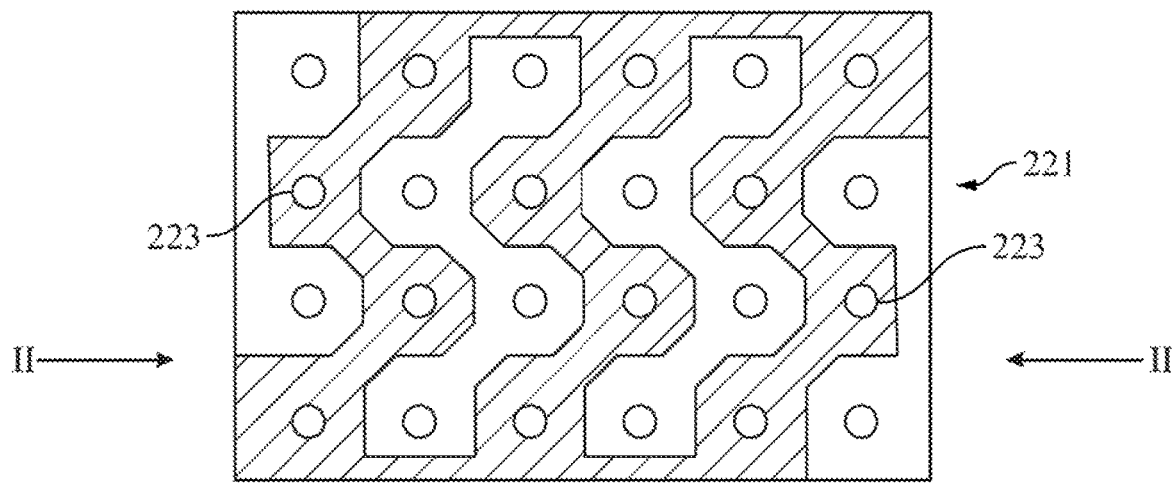
Figure 7B:
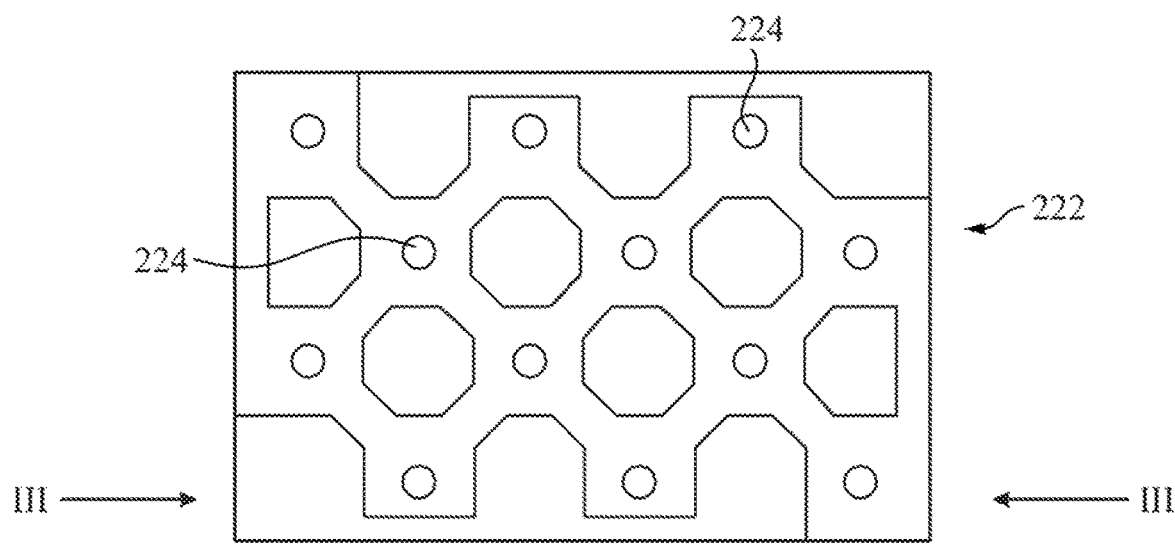
Figure 7C:
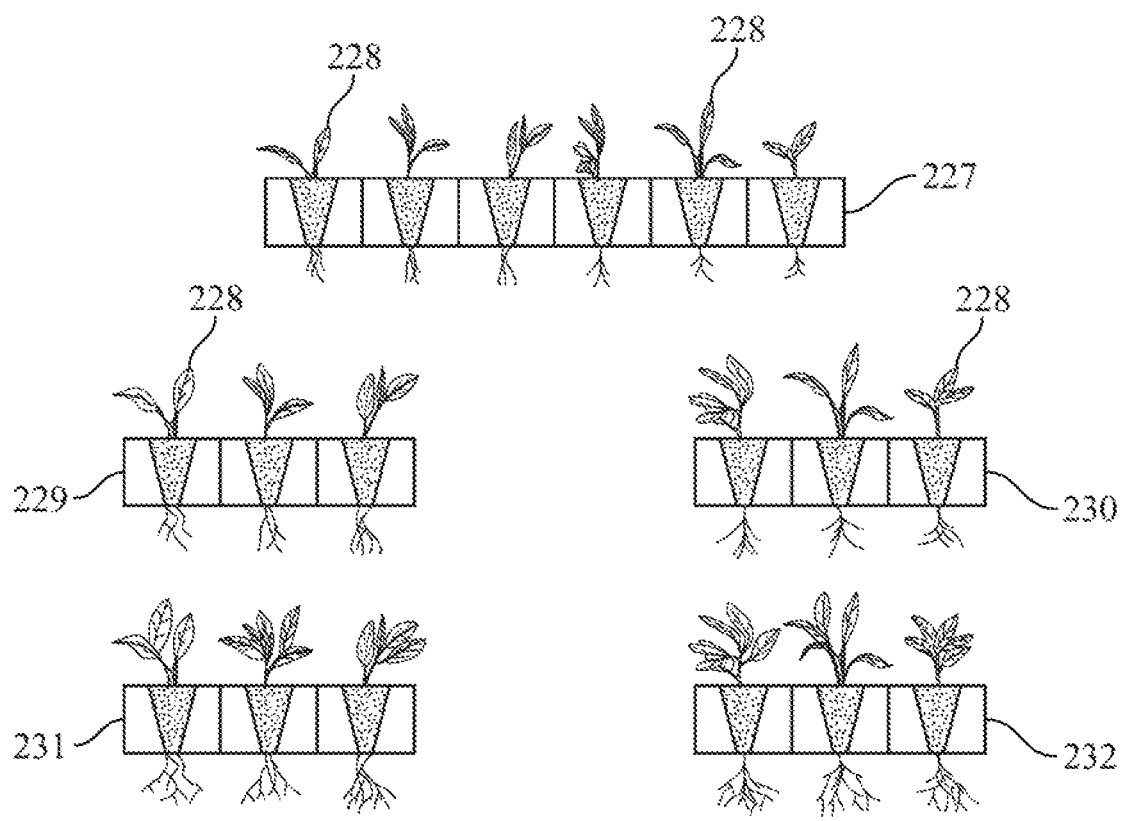

The present invention provides another alternative for providing the growing plants with extra room at the appropriate time that eliminates the need to move the plants to new cells in a new flat. The system uses a multiple insert arrangement where the inserts overlay each other and are separated at the appropriate time to provide the growing plants with room to continue growing. Each insert having a specific number of cells containing growing plants. FIG. 7 is a top view of an example of a two insert system 220 of flats. System 220 includes a first insert 221 and a second insert 222. In the example shown the first insert 221 has 12 cells 223 and the second insert 222 also has 12 cells 224. FIG. 7A is a top view of the first insert 221 by itself. It is lifted off of the second insert and thus forms a separate flat that can float by itself. FIG. 7B is atop view of second insert 222 by itself which when separated from the first insert forms a separate flat than can float. Referring to FIG. 7C item 227 is a cross sectional view along line I-I of FIG. 7 with growing plants 228 in each cell. Item 229 is a cross sectional view along line II-II of FIG. 7A with plants 228 in each cell. Item 230 is a cross sectional view along line III-III of FIG. 7B with plants 228 in each cell. As can be seen by separating insert 221 from insert 222 each of the growing plants 228 has additional room to grow. This fact is illustrated by items 231 another view the cross section along line II-II of FIG. 7A in which each of the plants 235 has grown bigger because of the extra room provided by separating the first and second insert. Likewise item 323 of FIG. 7C another view of the cross section along line III-III of FIG. 7B depicts how the plants 235 have room for more growth.

IV Transfer to the Second Stage Production Pond
(the Multiple Pond System)

Referring to FIG. 1 the next step in the process is the moving of the flats or trays to the second or next production pond step 36 or alternatively changing or refreshing the water the crop is growing in the production pond.

As noted above one of the Innovative aspects of the present invention involves the changing of the water the crop is growing in after a period of time that is less than the reproduction cycle of pathogenic microbes' that can damage or destroy the crop. By changing the water on a schedule that is shorter than the life cycle of harmful pathogens minimizes the chance of crop loss due to the pathogen. The invention provides three different way for changing the water: 1) use of a multiple production pond system that allows for the moving the growing plants to a new production pond; 2) transfer of the floating flats to a separate section of the same pond which has fresh water; or 3) keep the flats in the same pond and change or refresh the water in the pond on a periodic or constant basis.

In the multiple pond embodiment of the present invention in which spinach or some similar small green leafy vegetable are grown as noted newly seeded flats are floated in production pond 1 after germination for the first-half of the growing cycle (about 7 days), then transplanted to pond 2 for the remaining grow out period (7 days) until they are removed and harvested. This assumes the life cycle of potential pathogens is longer than 7 days. Naturally, if it is different than the time spent in each pond can be adjusted accordingly to the time period of the life cycle of potential pathogens. The object being to move the flats to a new pond on a cycle that is less than the life cycle of a potential pathogen. Alternatively, it entails changing or refreshing the water on cycle in a single pond system that is less than the life cycle of a potential pathogen.

Under the assumption that flats that enter pond 1 are uninfected, spores of pathogenic species in pond 1 could infect the recently planted, healthy flats, but they would not be able to carry out their reproductive cycle and release spores back into pond 1 before flats are transplanted to pond 2. Thus, the flats leaving pond 1 could be infected, but the water in pond 1 should be free of spores once the infected flats are transplanted to pond 2, which means the next batch will not get infected in pond 1. After additional cycles, the phenomenon extends to pond 2, since the flats leaving pond 1 will be uninfected and remove most spores from pond 2 before they can reproduce and release spores back into pond 2. Thus, pond 2 will have a low concentration of pathogenic spores as well.

This procedure can be scaled such that multiple transplants further reduce pathogens' ability to reproduce throughout the crop cycle. For example, a three pond system would require two inter-pond transfers that divide the crop cycle roughly into thirds. The length of a third of the growth cycle being less than the reproductive cycle of the pathogenic microbes you want to protect the growing crop from. As noted previously the multiple pond production process of the present can be scaled to the growth cycles of any vegetable, such as longer growing cycles of large leaf lettuce or root crops such as carrots, beets, radishes, etc. The key is setting up the pond transfer cycle to move the plants to a new pond before the completion of the growth cycle of the pathogenic microbes that can affect the crop.

In the preferred embodiment plats are transferred from pond to pond in a direction such that they move closer to the harvesting area, or in a single pond system to the end of a bay in a pond system where harvestable flats can easily be removed and transported.

In one embodiment of the system for moving the flats from one pond to the next a mechanical device will accomplish inter-pond transfer by lifting an entire row(s) of flats out of the pond and rotating/pivoting to gently place the flats in the adjacent pond. Additionally, the apparatus will push the next row of to-be-transplanted flats onto the transplanting device in pond 1, and move the most recently transplanted row down in pond 2 so that another row of flats can enter from pond 1.

Figure 8:
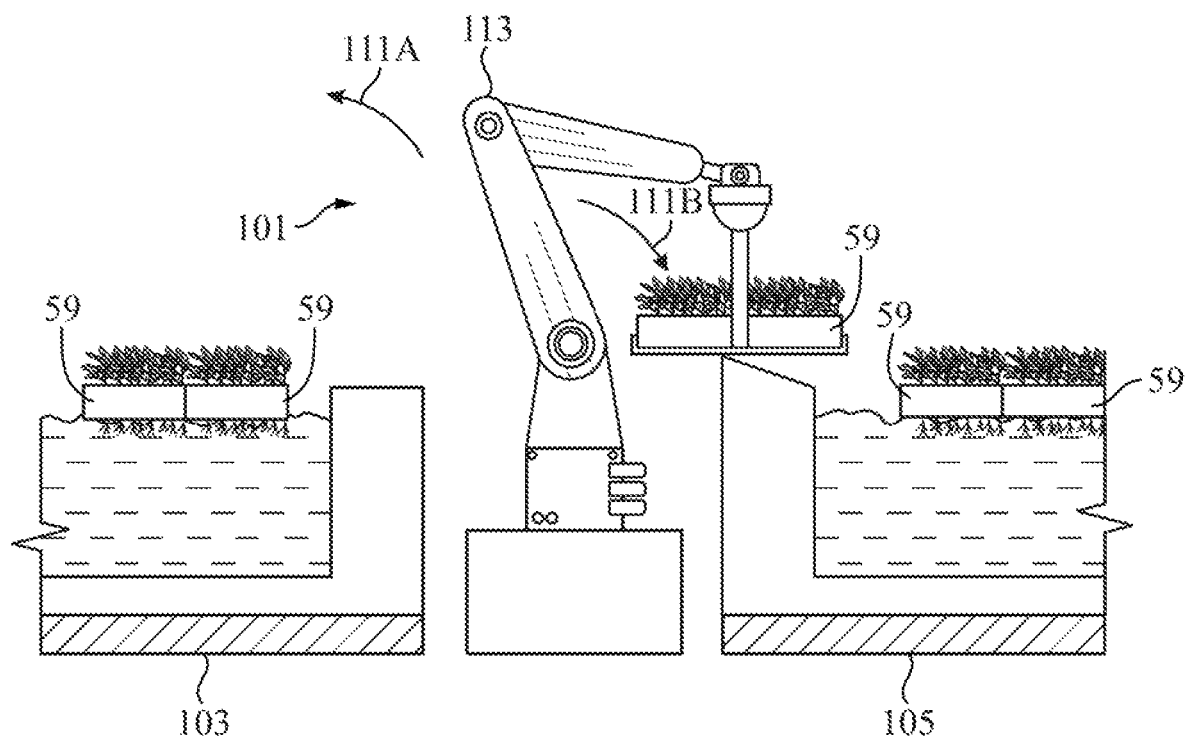
FIG. 8 depicts a schematic of a machine that moves the trays or flats the plants are growing in between two production ponds in one embodiment of the invention.

FIG. 8 is a schematic of system for transferring the flats from pond to pond. Mechanical device 101 moves the sections of flats 59 from first stage production pond 103 to second stage production pond 105. Hoist arm 109 can pivot back and forth in the direction of arrows 111A and 111B and turn around to ether pond and pulley 113 can lower or raise the flats 59 it holds to take them out of the pond or place them into the pond in the standard fashion. Thus, the flats can be moved from pond to pond.

Figure 9:
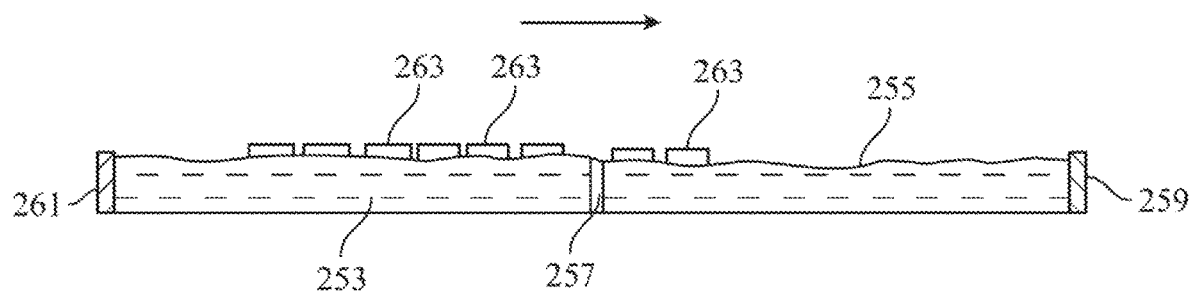
FIG. 9 provides a schematic a single pond system that uses essentially the same process and achieves the same results as the multiple pond system.
Figure 9A:
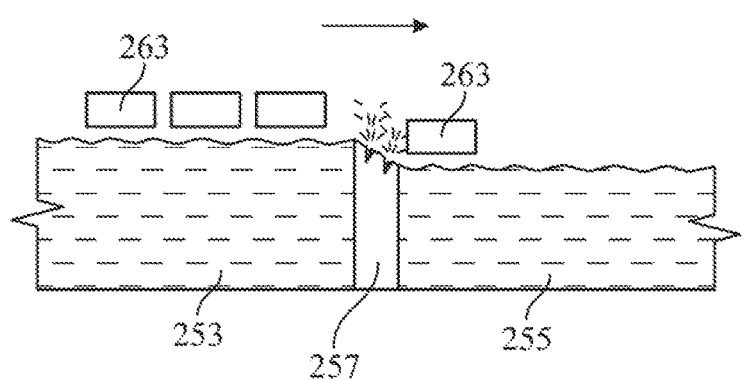
FIG. 9A is a schematic diagram of one embodiment of the apparatus for moving flats between different sections of the single pond embodiment of the present invention.

As noted above an alternative method involves breaking a single pond into two or more sections where the water in each of the sections is isolated from the water in the other sections. FIG. 9 is a cross sectional schematic of this embodiment with pond 251, pond section 1 253 and pond section 2 255, barrier 257, pond end walls 259 and 261, and flats 263. Barrier 257 separates pond section 253 from 255 and prevents the movement of water between sections 253 and 255. However, the flats 263 with growing plants in them can be easily moved over barrier 257 between section 1 253 and section 2 255. FIG. 9A is a cross section close up view of the barrier 257 between the sections 1 253 and section 2 255 of the pond. In this set up the flats 263 are pushed over an in-pond barrier 257 that prevents the flow of water "backwards". To facilitate the movement of the flats 263 over barrier 257 jets 265 of water can be provided to protect the bottom of the flats and make them slide over the barrier.

Referring back to FIG. 1 while the flats or trays with the growing plants float in the second stage production pond, or any additional production pond at the next step 37 the process again provides for the control of various growth factors or parameters while in the pond. Among these are: 1) light the plants receive to optimize growth, 2) ambient air temperature, 3) ambient water temperature, 4) nutrients in the water, 5) the pH of the water and 5) the quality of the water in the pond, such as it being free of harmful pests such as fungus etc.

Once the crop has reached maturity, whether it has been raised in a two pond, three pond or larger system the final stage is harvesting of the crop step 38 FIG. 1 and then the system is prepared for the next crop by the processing of the water to neutralize harmful pests and recondition the water for reuse 39. The ponds are cleaned and prepared for the next crop.

V Control of Various Growth Parameters

Sensors and Environmental Control:

As noted in the preferred embodiment of the invention the system described herein will be located in an enclosure that has a translucent or clear covering to allow all of the natural light available to assist in the growth of the plants, generically called a greenhouse. In the preferred embodiment an automated HVAC system will be employed within the enclosure. Off the shelf or custom built modules will monitor conditions and relevant parameters in the pond. It will have data storage/logging capabilities such that a pond conditions will be monitored, the information recorded to allow assessment of results, and a determination of optimal conditions for production. Pond parameters will then be set and maintained based on what are the best for the crop to be grown. For example fertilizer can be injected and pH adjustment made based on predetermined parameters. Light data will be gathered from different locations in the greenhouse at both pond and canopy level by way of photosynthetically active radiation (PAR) sensors. This data will provide real time inputs to the supplemental light algorithm that determines the output intensity and spectrum from fixtures in different zones of the greenhouse.

Figure 10:
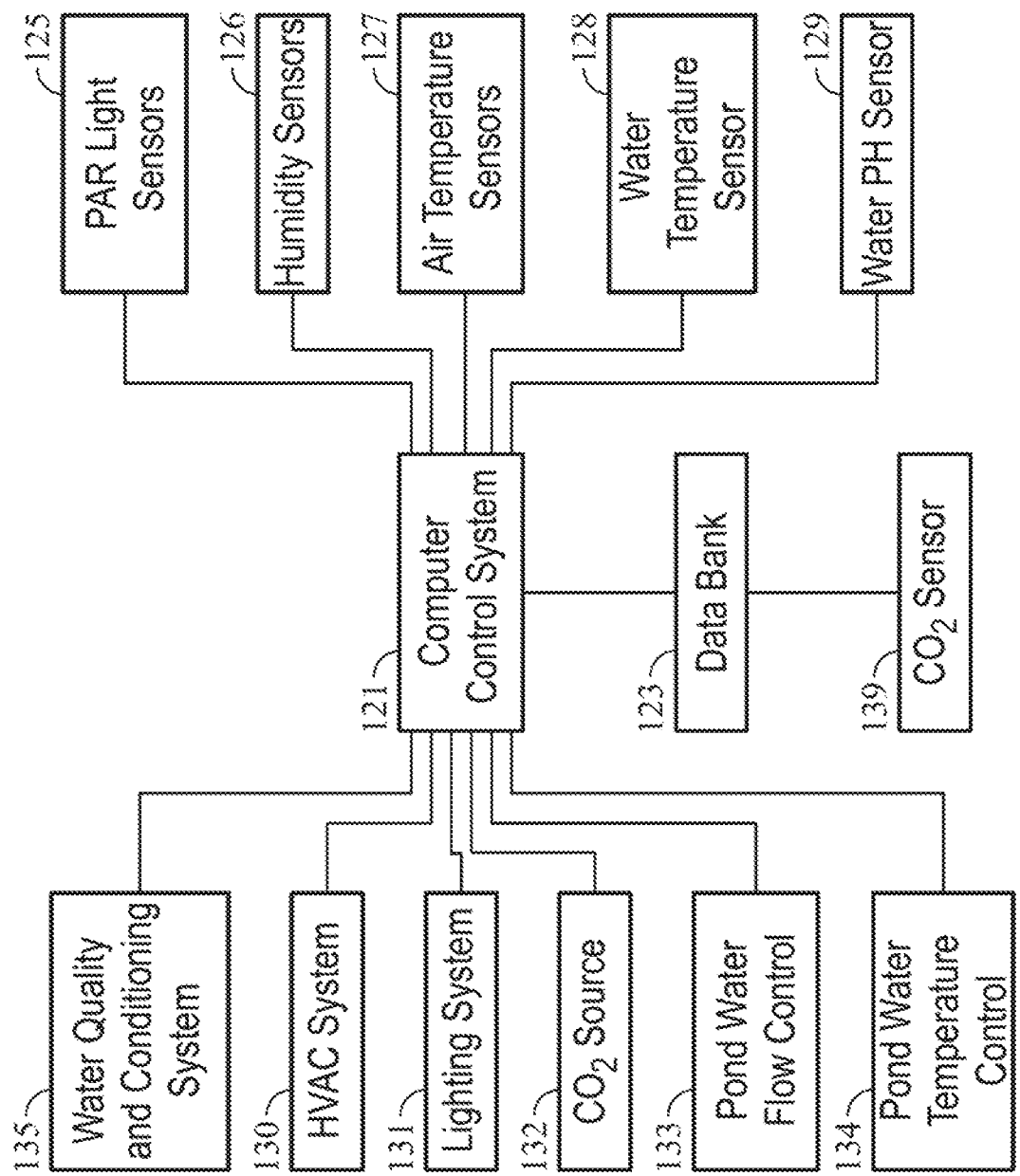
FIG. 10 is a schematic of the major elements of an embodiment of an environmental control system of the present invention.

FIG. 10 is a schematic diagram of the various components of the sensor and environmental control system. The complete system in its preferred embodiment would include a computer control system 121, a storage and data bank 123, various sensors positioned in the greenhouse: PAR light sensors 125 positioned at various places in the greenhouse, humidity sensors 126 positioned at various positions in the greenhouse, air temperature sensors 127 positioned at various places around the greenhouse, and CO2 sensors 139. Additionally, water temperature sensors 128 and water PH sensors 129 are positioned at various places in each of the ponds. In addition the greenhouse has various environmental control systems connected to and controlled by the computer controller 121 namely heating ventilation and air conditioning system (HVAC) system 130, a lighting system 131, a CO2 source 132, pond water control flow system 133, a pond water temperature control system 134, and a water quality conditioning system 135.

Computer control system 121 would be programed to gather information from the various sensors in the greenhouse and initiate action based on the data gathered with respect to the conditions in the greenhouse and adjust, change and control the various growth parameters which will be discussed in detail below. It should be noted that unless stated otherwise the parameters discussed are those to be achieved in all the production ponds—the first stage production pond, the second stage production pond, third stage production pond etc. at steps 34 and 37 of FIG. 1. In some instances, there are exceptions such as with lighting where PAR at the red end of the spectrum is emphasized at the beginning in the first production pond and PAR at the blue end of the spectrum is emphasized near the end of the growth cycle for certain crops such as spinach to achieve a certain quality enhancement of the crop. Another example would be higher nutrient concentration at the end of the cycle when plants are larger and growing more vigorously.

Air Temperature, Water Temperature and Humidity Control, and Addition of CO2

In the germination area temperatures will typically be kept at 22'C to 26° C. and relative humidity as close to 100% as possible. Computer control system 121 in conjunction with humidity sensors 126 in the germination area and HVAC system 130 will maintain these parameters during germination.

The air temperature in the greenhouse in one embodiment of the invention will be maintained in a range of approximately 20-30 C° C. during daylight hours or when the lighting in the green house is on. At night when dark the air temperature will be maintained in a range of approximately 16-25° C. Computer-control system 121 using temperature sensors 127 will determine when to and how to use HVAC system 130 to heat or cool the air in the greenhouse as needed.

In a preferred embodiment of the system of the invention water temperature will be kept at or below 20° C. (68° F.). The purpose is to suppress the growth of harmful organisms such as pythium a destructive root parasite. Computer control system 121 in conjunction with water temperature sensors 128 and pond water control system 134 will maintain this temperature. Specifically, the pond water is pumped through chiller 77 FIG. 6 to maintain water temperature at or below 20° C.

When the flats with growing crops are in the pond relative humidity must be managed to control evapotranspiration and prevent disease and mildew growth. For most plants 75% or less humidity is sufficient.

When feasible, elevated levels of CO2 will be maintained during light hours to boost photosynthesis/biomass gain, and as a means of reducing the amount of light necessary to achieve comparable yields at ambient CO2. Computer Controller 121 will detect CO2 levels using CO2 sensor 139 and add CO2 as needed from CO2 source 132. In a preferred embodiment CO2 levels will be maintained at 450 to 1600 ppm when it is light in the greenhouse. However, when the HVAC system requires venting, supplemental carbon dioxide may be turned off as temperature and relative humidity set points are prioritized over CO2 concentration. During dark hours, except immediately before light is applied/expected, supplemental CO2 is not used and is usually ambient: 400-450 ppm. As will be noted below CO2 levels will be managed in the preferred embodiment with light levels to optimize the effect light and CO2 have together on the growing crop to achieve the most economic gains in biomass.

When supplementing CO2, it is desirable to keep the greenhouse at an elevated CO2 for as long as possible. This can be done by delaying venting, which is the main vehicle of cooling and dehumidifying the greenhouse. Delaying venting can be achieved through the use of specialized air conditioners and dehumidifiers which can help extend the duration of elevated CO2 inside the greenhouse. Delaying of venting can additionally be achieved by bringing temperature and relative humidity to their lowest acceptable levels before light is expected. This way, more heat and relative humidity can be tolerated in the greenhouse before venting is needed to expel it.

Control of Water Quality

A number of steps will be taken to control water quality ranging from preservation of nutrients to preventing the growth and spread of harmful bacteria, fungi, and other pests, some discussed above and more discussed below. New water added to the system to fill ponds and maintain water levels may be filtered in order to remove chlorine/choramines, alkalinity, heavy metals and microbes. Reverse osmosis, deionizing, charcoal, mechanical, and distilling filters are some options through which this may be achieved. FIG. 10 includes water temperature sensors 127 and a pond water temperature control system 134 to keep pond water below 20° C. and prevent the growth of phytium and harmful watermolds, fungus or bacteria.

Aeration of Water: Referring to FIG. 6 air is bubbled into the water via venturi air injector(s) 79 directly downstream of the chiller 77. In addition to or alternatively industrial air pumps connected to air diffusers and/or air stones anchored to the bottom of the pond throughout can be used to maintain a high dissolved oxygen levels throughout the pond. Liquid oxygen can also be used as an oxygen source, especially in ponds with a heavy crop cycle to ensure adequate levels of dissolved oxygen (DO).

Inline Agitator: Referring to FIG. 6 again a shearing mixer 85 similar to a high-shear mixer used for emulsification in the production chemicals and pharmaceuticals can be used as an in line mixer to aggressively agitate the water and immobilize pathogenic spores.

Figure 11:
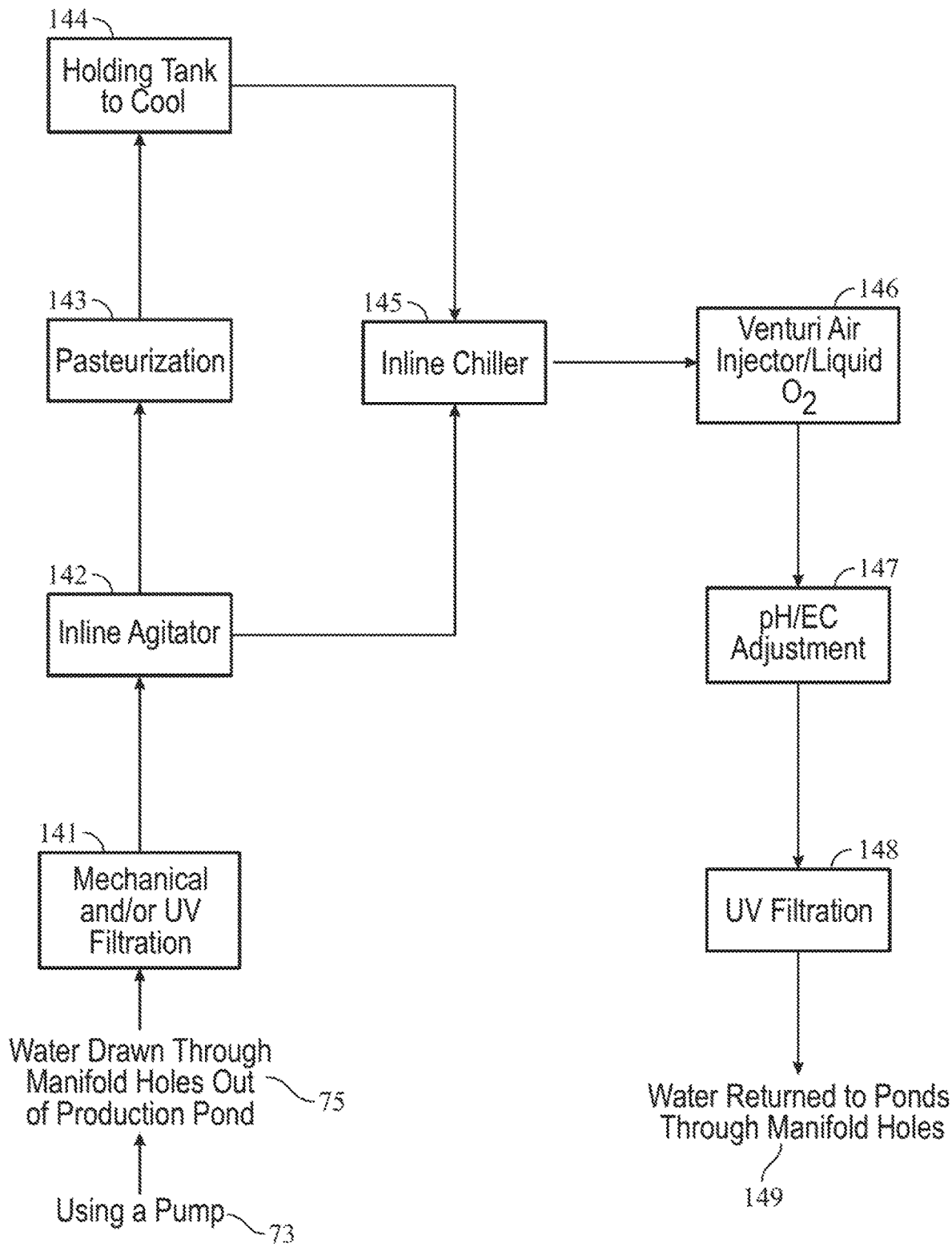
FIG. 11 a schematic diagram of a parallel or alternative water circulating and conditioning system to that depicted in FIG. 6.

Pasteurization and Recycling of Nutrient Solution: FIG. 11 provides a view of another water cleansing system that can be in line with the above system at FIG. 6, as a parallel system working with it, or as an alternative system. Referring back to FIG. 11 water is withdrawn from the production pond by a pump 73 through manifold holes 75, passed through a mechanical and/or UV filters 141, then passed through a in line agitator 142. At this point some or all the water can be passed on to a pasteurization chamber 143 where it is pasteurized and then onto a holding tank to cool 144 before being passed onto inline chiller 145. Alternatively, or as part of the process some of the water can be passed directly from inline agitator 142 to line chiller 145. Once the water passes through in liner chiller 145 it flows through a venturi injector 146 for increasing DO in the water. The oxygen can come directly from a liquid oxygen source or form air injected into the stream of water. From the venturi air injector 146 it moves on to a pH electrical conductivity (EC) adjustment chamber 147 where, as discussed below, various substances are added to set the pH, EC and nutrients in the water through addition of salts or stock solution, acid or base. In the last step the water passes through UV filtration 148 back into the pond through the manifold holes of the piping in the pond 149.

In the pasteurization process 143 when heated to 180 F, potentially harmful pathogenic microbes in the pond water are destroyed. After pasteurization, the water is directed into a holding pond 144 to start a cool down process for the water. As noted above, to prevent having to completely empty and refill ponds with fresh water and nutrient solution, a pasteurization process can be implemented to sterilize and recycle the water during the growth cycle with a portion of the water being withdrawn and run through a pasteurization cycle as noted above. Additionally, after the growth cycle the existing water in each of the ponds can be run through the pasteurization cycle as noted above to reconstitute the water for use in the next growth cycle.

A number of variations on this process can be implemented, water will be removed from production ponds, pumped through a filter (UV and/or solids), and sent to a pasteurizer (either inline or batch). After pasteurization, during which time the water is held at critical temperature for a multiple of decimation times (of the pathogens of most concern), the water will be pumped to a holding tank where pH, temperature, DO, and EC adjustment take place to return pasteurized water to optimum pond set points. This process can include a mixing of pond production water with fresh municipal water that may be filtered as previously discussed. Finally, the water is returned to the production pond. As noted above this process can take place both during a crop production and in between crop-cycles when the pond may not be in use.

Chlorine Sanitation: Production water can be chemically sterilized with calcium hypochlorite or other chlorine derivatives if sufficient concentration is maintained long enough to kill microbes in the water. After flats are removed from a pond and it is to be sterilized, no new flats will be planted in it until chlorine levels drop to non-harmful levels in the pond. Activated charcoal filters and aeration can be used to scrub and volatilize chlorine more quickly and completely.

During this time pond downtime, platforms can be laid across the ponds such that seedlings or different crops can grow outside of the production ponds but still receive supplemental and natural greenhouse light. They will be watered from and drain to a separate reservoir.

Control of Nutrients in the Water and pH

Nutrients are added to the pond water in the form of Stock A 160 FIG. 12 and B solutions 161 FIG. 13 which contain concentrated macro and micronutrients essential to plant growth. The fertilizer solution is balanced with recent water analysis tests to ensure proper concentrations of all minerals and salts in the pond production solution.

Stock solutions are added such that the electrical conductivity of the pond water (the proxy measurement for synthetic fertilizer strength) is between 800 and 2500 mS/cm over the background level of salt. The pH of the pond water is adjusted to between 5.5 and 7 to maximize nutrient bioavailability to plants. Nutrient recipes are adjusted based on target concentrations and background salt levels. FIG. 14 provides a table 162 of various concentrations of micro and macro nutrients that could be expected in production ponds after addition of stock solutions, but the recipes are different for different crops and can vary from the beginning to the end of the crop cycle as the plants' metabolisms develop.

Lighting Control:

Modified LASSI Daily Light Integral (DLI) Control: The Light And Shade System Implementation Algorithm both with and without integrated CO2 (Carbon Dioxide) control, termed LASSI U.S. Pat. No. 5,818,734 (which is incorporated herein by reference), will be modified and improved according to the present invention and applied to control the supplemental lighting fixtures arranged above the ponds.

The algorithm's rules specify when to turn on and off lights and when to apply shading in a greenhouse in order to receive a consistent amount of light each day. The original algorithms will be modified such that they take into account: 1) The inexpensive/rapid ability of LED fixtures to turn on and off, as compared to High Pressure Sodium (HPS) lamps. 2) The ability of LED fixtures to dim and alter their predominant output wavelength (detailed below). 3) The ability of LEDs to emit a dim variable spectrum light during dark hours to discourage infection by mildew pathogens. 4) Constant (no off-peak) electricity prices (in some locations) 5) A desired photoperiod of 20.5 hrs per day. 6) Carbon dioxide enrichment in morning hours/winter when ventilation is low and its effect on DLI goal 7) A higher tolerance for DLIs above target since spinach is not as susceptible to tip burn under high light conditions when compared to lettuce. FIG. 15 provides a chart of the various factors used to determine optimal output of the light fixtures in the greenhouse.

Spectrum Control, Optimization, and Development of Light Recipe: Different wavelengths in the PAR portion of the spectrum have markedly different effects on growth, texture, nutrient content, and more. Supplemental light, by means of LEDs, HPS (high pressure sodium), CMHY (ceramic metal halide), and/or MH will be applied in order to reach the 17 mol/m2/day target DLI. They will also continue to operate above and beyond the 17 mol/m2/day target when possible and profitable as a means of tailoring leaf characteristics including size, texture, shelf life, nutrient content, and taste.

For example, on days when the natural DLI is expected to be far below the target, supplemental light could be predominantly red. On days when the natural DLI is expected to be near or above the target or plants are in the final days of their crop cycle, supplemental light could be predominantly blue to enhance leaf flavor, nutrient content and texture.

The light recipe will consider light intensity, spectrum ratios received, and quantity of light received by a flat since seeding, as well as other factors like ambient temperature, CO2 concentration and current leaf size, to determine the optimal supplemental light the flat should receive at each time step until harvest.

FIG. 16 is a flow chart of an embodiment of a method that optimizes light exposure of a growing crop using the concepts discussed above. As noted above and discussed with respect to FIG. 17, various light sensors determine the ambient light levels by measuring photosynthetic photon flux density (PPFD) in moles of photons per meter squared per second (mot m-2 s-1) in real time 171. Referring back to FIG. 16 the next step 172 is providing an artificial light source to supplement natural light to the desired level so the crop reaches its daily light goal. In one embodiment the goal is to maintain the overall all PPFD over the growing crop to maintain 17 mol/m2 day DLI throughout the crop cycle. As mentioned above and discussed below with respect to FIG. 17 banks of LED's in combination with metal halide and/or ceramic metal halide and plasma lights provide the necessary artificial light to achieve the desired PPFD levels.

Referring back to FIG. 16 to optimize the quality of the crop produced exposing the growing crop to higher levels of PPFD light at the red end of the PPFD spectrum enhances vegetative growth (especially axial) of the crop. However, on the other hand emphasizing levels of PPFD light at the blue end of the spectrum near the end of the growing cycle enhances the texture and taste of the crop, in particular spinach and other small green leafy vegetables. In one embodiment the objective at step 173 is to assure the PPFD spectrum of the artificial light source is shifted towards the red end of the PPFD spectrum during the first 70% of the crop growth cycle. Then at step 174 the PPFD spectrum of the artificial PPFD source is shifted towards the blue end of the PPFD spectrum during the last 30% of the crop growth cycle. This is only one example of using the ability to control over all light exposure to achieve a desired result.

Additional steps that enhance the growth of the crop when coordinated with light are CO2 levels. Consequently, step 175 CO2 levels in the ambient air available to the growing crop are maintained at up to 1600 ppm during day light hours when possible. During dark hours at step 176 CO2 levels in the ambient air available to the growing crop can be reduced to approximately 450 ppm during night hours (ambient [CO2].

Figure 17:
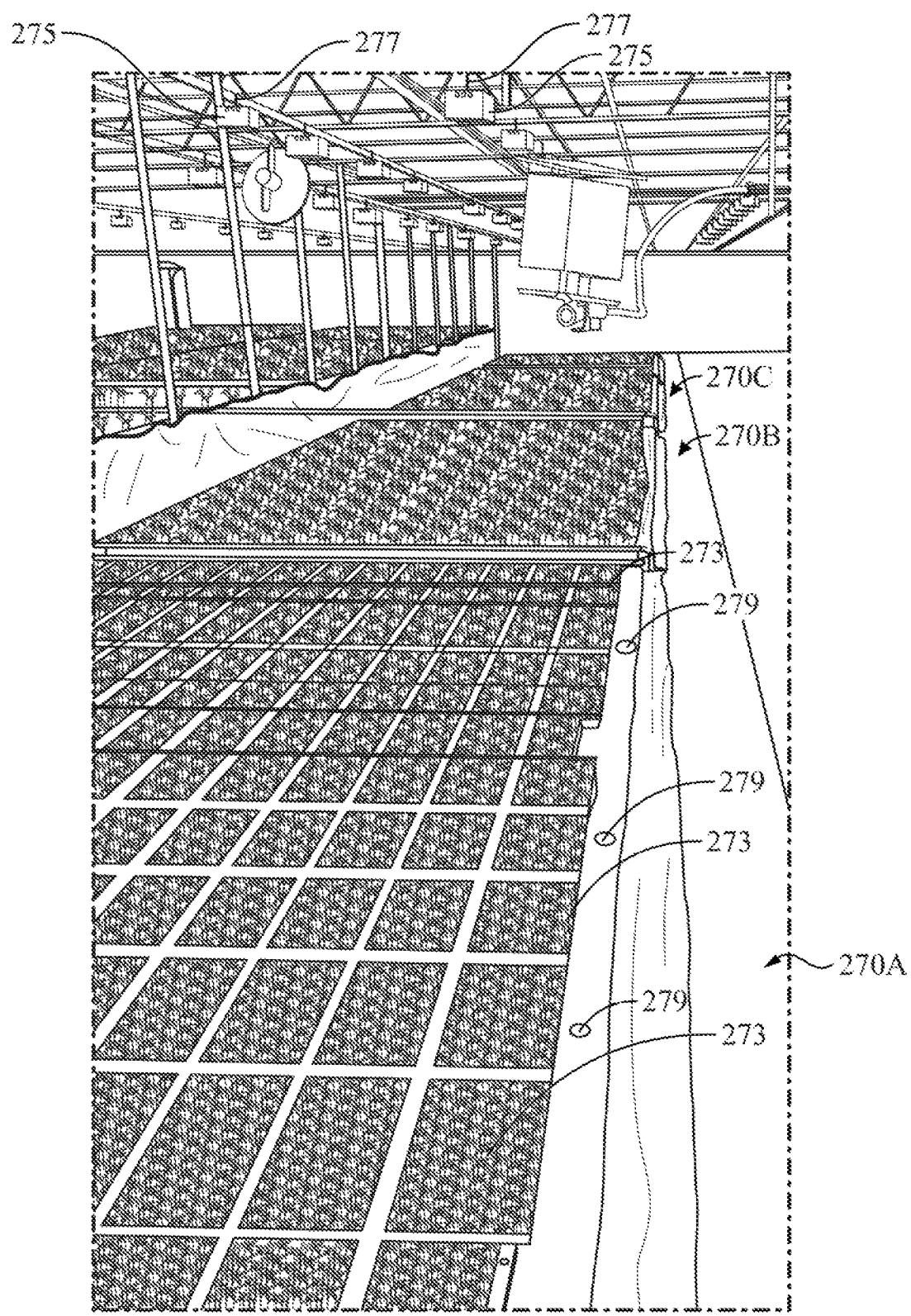
FIG. 17 a perspective view of an interior of a greenhouse depicting among other things light fixture and PAR sensor placement.

FIG. 17 is a perspective view the interior of a greenhouse employing some of the embodiments of the invention. Three ponds 270A, 270B and 270C stretch out in this perspectives view into the distance. Each of the ponds is completely covered by floating flats or trays 273. As can be seen the youngest plants are in pond 270A, more mature plants are in pond 270B and the most mature plants of the crop which are almost ready for harvesting are in pond 270C. LED light fixtures 275 are up above each of the ponds. PAR sensors 277 are located up above the light fixtures near the transparent or translucent cover of the green house. There are also PAR sensors 279 located down at the level of the ponds. Additionally, as noted above there are temperature, humidity, CO2 and other sensors strategically placed around the greenhouse. There are also temperature, EC, and pH sensors in the ponds.

Each cultivar has a certain light goal. This goal can change as the crop matures in both light quantity (mol/m2/day) and quality, as in the percent of light received at different frequencies (UV, red, blue, far red, IR, etc.).

The following is an example of a light goal for one day in the crop cycle of a distinct cultivar such as kale of 20 mol/m2/day consisting of: a) 30% IR, b) 4% far red, c) 35% red, d) 30% blue, and e) 1% UV light with each category represents a range of frequencies received by the plant.

The goal can also be impacted by the amount of light the crop has received in previous days and the amount expected in the coming days. If the previous days' light was significantly more or less than the goal, or if the coming days are expected to be especially dark or bright, the light goal for that day can be adjusted.

Other environmental factors can also influence the efficacy of the light plants receive. For example, each crop has an optimum temperature for growth. This optimum temperature can change based on time of day, crop maturity, and other factors. Deviations from this temperature result in reduced growth.

If, for example, the previous day was bright, but the temperature was above the optimum temperature during lighting hours, the assumed growth of the crop during that interval would be assumed lower than had the crop received the same amount of light, but at optimum temperature. This can influence the light goal for that day. Additionally, if the present day or future days are expected to have non-optimal temperature in the greenhouse, the light goal can be adjusted.

This principle can also be applied to the electrical conductivity, temperature, pH, dissolved oxygen and mineral composition of the pond production water as well as the relative humidity of the air in the greenhouse. These factors all influence the efficacy of light and resultant growth.

Carbon dioxide supplementation can influence the efficacy of light and relative growth of plants as well. If light is expected to be applied while air in the greenhouse is above or below ambient [CO2], the light goal can be adjusted (more growth expected when CO2 is higher, so the light goal could be decreased). The carbon dioxide concentration in the greenhouse on previous days and the coming days can also influence the light goal for the current day as they influence the growth previously experienced and expected.

Media Recycling:

Media from the flats will be removed as the first step in cleaning them after harvest. The propagation mix, roots, and plant stems will undergo a multi-stage process including draining, mechanical sieving, addition of other organic/non-organic material, composting and/or aeration, desiccation, sterilization/pasteurization, and/or nutrient content/pH adjustment.

FIG. 18 is a flow chart that shows one embodiment of a media recycling process the present invention. First the growth media and plant material left over from the harvesting process is gathered 201. The next step is the mechanical sieving 202 and then the addition of additional organic matter 203. The material is then composted and desiccated 204. The next step after composting and desiccation is a sterilization and/or pasteurization process 205. Next the pH and EC is adjusted to desired levels and the material is used directly a media in a growth cycle or mixed in with new media 207. Alternatively, given the needs at the time if there is excess it can be repurposed or sold 208.

After this process, the media will be sold, repurposed, or reused in production either in pure form or mixed with fresh propagation mix. To mitigate contamination risk or reduce the amount of sterilization necessary, the recycled media could be used to propagate seedlings grown outside the pond system in self-contained trays watered from and draining to a different reservoir (i.e. growing microgreens or ornamental plants).

VI Additional Embodiments

Another Embodiment of the Floating Tray

Figure 22:
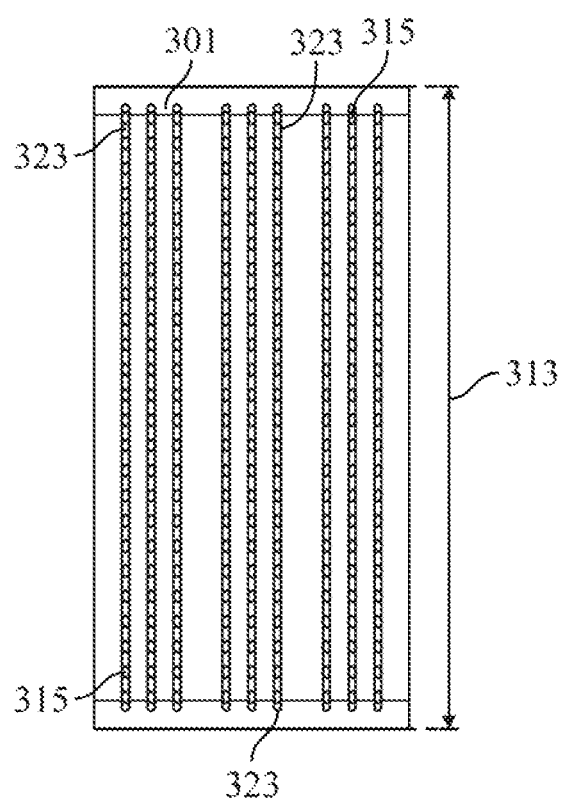
FIG. 22 is a bottom view of the embodiment of the floating tray or flat of FIG. 19.
Figure 23:
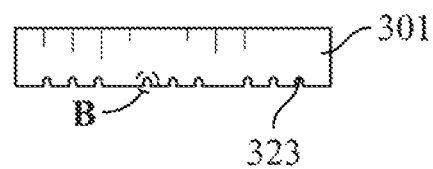
FIG. 23 is a side view along the short side of the embodiment of the floating tray or flat of FIG. 19.
Figure 23A:
FIG. 23A is an enlarged view of the circled area B at the lower center edge of the view of the tray depicted in FIG. 23.

FIGS. 19 to 23A depict another embodiment of a floating tray, flat or raft 301 on which the cultivar or crop can be grown. FIG. 19 is a raised top prospective view of this embodiment and FIG. 20 is a top view of tray 301. The embodiment of tray 301 depicted has three major columns 303 and each major column 303 has three columns of cells 305. Each column of cells having 24 individual cells 311. Each of the major columns 303 have a buffer space 307 between. FIG. 21 is a side view of tray 301 along its long axis 313. FIG. 22 is a bottom view of tray 301. Each of the cells 311 have on opening 315 at the bottom of tray 301 as depicted in FIG. 22. FIG. 20A is an enlarged view of that portion of the upper left corner of tray 301 in FIG. 20 in the portion encircled at A. In FIG. 20A each of the cells 311 are oval and concave in shape, the top opening 317 being larger that the bottom opening 315. In the embodiment of the floating tray depicted in FIGS. 19 to 23A all of the major axis 319 of all of the oval cells 311 run parallel to longitudinal axis 313 of tray 301. FIG. 23 is an end view of tray 301 along latitudinal or short axis 321 of tray 301. Grooves 323 runs up the bottom of the column of cells. FIG. 23A is an enlarged view of the circled B part of FIG. 23. It provides an enlarged view of the grove 323 that runs up the bottom side of tray 301 through the bottom openings or each of the cells. Groves 323 are also visible in FIG. 22. Also, between each of the three columns 303 of cells are buffer or open spaces 307. Additionally, around the outside periphery of tray 301 is an open or buffer space 309.

Figure 24:
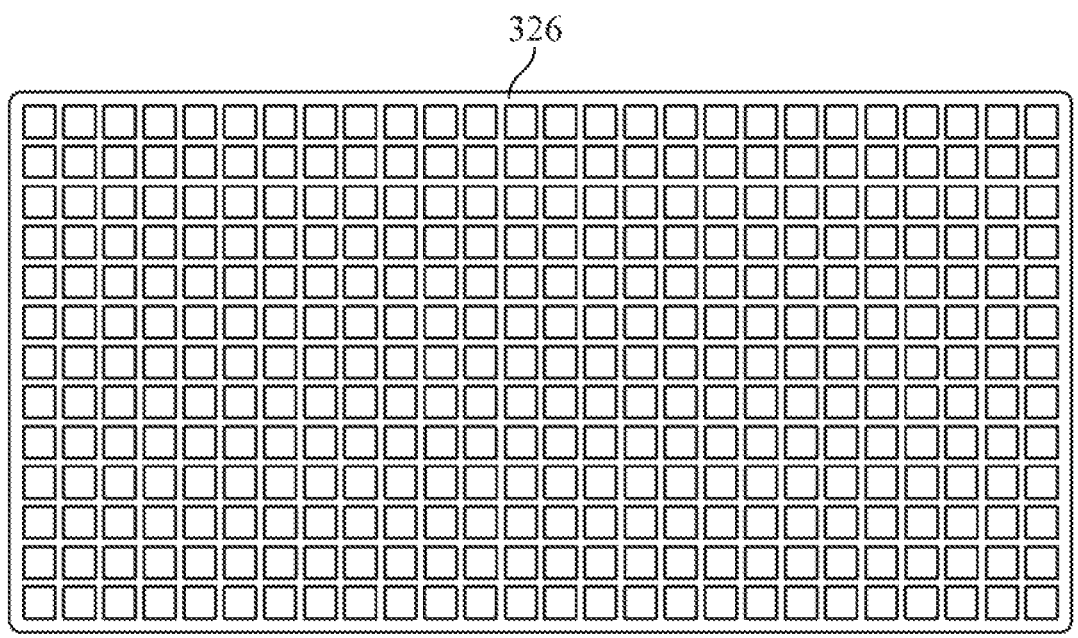
FIG. 24 is a top view of a prior art floating tray or flat.

The size and configuration of a particular tray 301 depicted in FIGS. 19 to 23A will vary depending on the type of crop grown in the tray. For small plants naturally the cells will be closer together for larger plants they will be spaced further apart etc. The following particulars of size etc. of tray 301 are for a crop or cultivar of kale and is provided for illustrative purposes, other crops or cultivar would call for different configurations size etc. but such changes would not depart from the concepts of the invention as those skilled in the art will appreciate once they understand to concepts of the Invention and they would be able to adapt the tray to the particular crop without departing from the concepts of the invention. In the example of tray 301 is 25½ inches on its longitudinal axis 313, 12½ on it short or latitudinal axis 321, 2$^{17}$⁄$_{64}$ inch thick. Each of the oval cells 311 is $^{13}$⁄$_{16}$$^{th}$ of inch on the major axis 319 of the top 317 of the oval cell and the minor axis 325 of the oval at the top of cell 311 is $^{11}$⁄$_{16}$$^{th}$ of an inch. Tray 301 FIGS. 19 to 23A can in be made of expanded polystyrene or any other similar light weight formable and buoyant material. In the prior art the floating tray or was simply a matrix of cells that covered the entire tray 326 as depicted in FIG. 24.

The various embodiments of the trays described and depicted herein solve a number of problems and deficiencies of the prior art. Crops grown in tray 326 a prior art version of a floating tray used in a hydronic system suffers from crowding thus stunting and limiting growth. Also, plants along the edges of tray 326 can become entangled with adjacent trays and machinery used to move the trays and process the crops grown. Tray 301 solves the problems posed by providing a boarder 309 around the edge and boarders or buffer spaces 307 within the interior of tray 301. By providing the extra space plants can be grown to maturity in tray 301 and thus do not have to be moved to another tray that provides more room during the growth cycle. Additionally, space or border 309 around the periphery not only provides growing room it prevents the plants around the edge of the tray from becoming entangled with adjacent trays and machinery used to move the trays and process the crop at the end of the growth cycle. By decreasing the density of plants on the tray it actually raises the crop yield. Additionally, one of the significant cost factors when floating trays are used is the cost of the growth substrate (growth media) used. By eliminating cells around the edge of the tray and in the interior of the tray it has been found this reduces growth substrate costs without reducing yield in fact the yield and quality of the crop improves.

Figure 25:
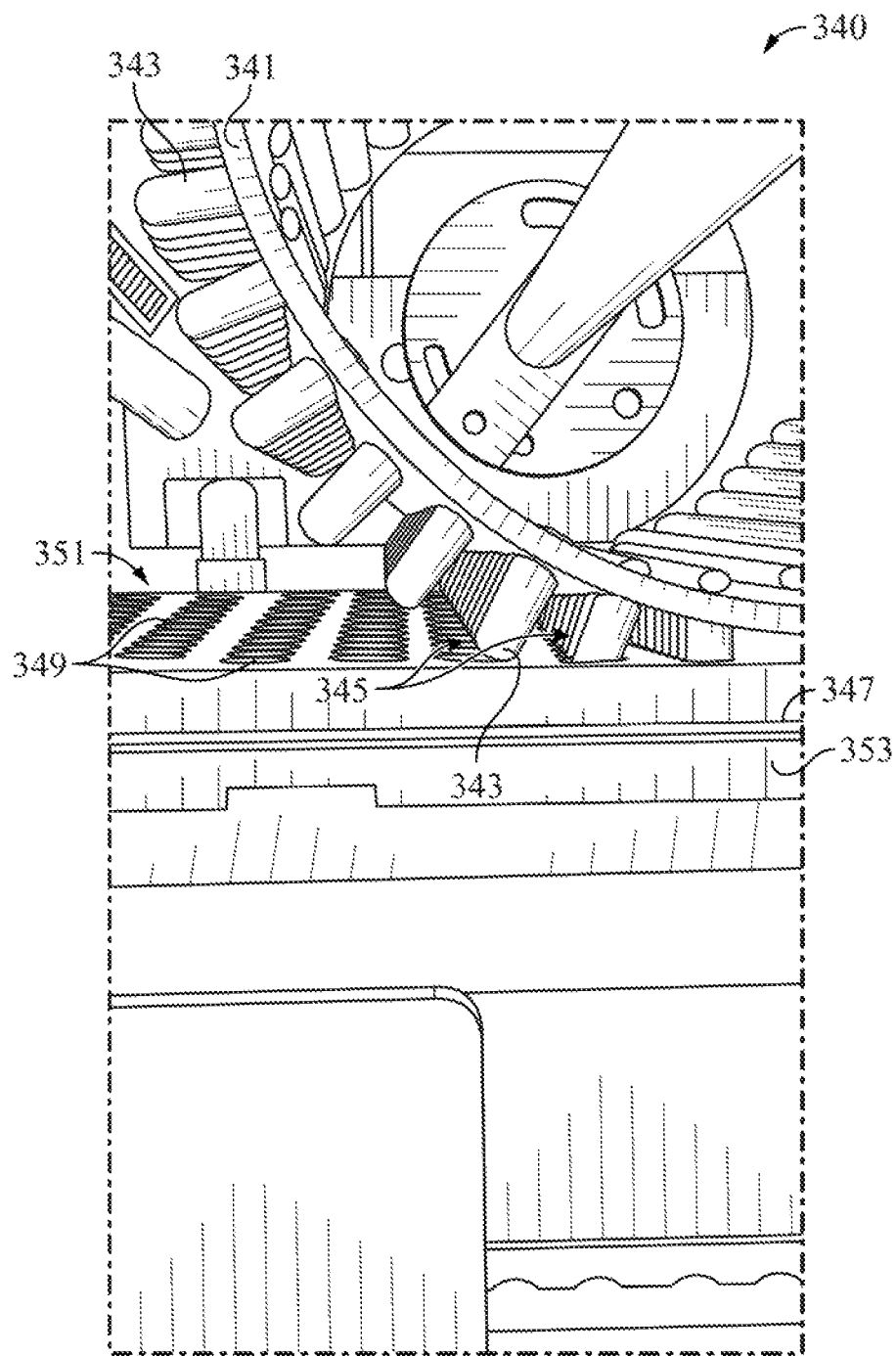
FIG. 25 is a side view of a dibbling machine used to plant seeds in the cells of the floating flats or trays.

Commercial the hydroculture systems are automated to the maximum extent possible; this includes automated systems for planting or dibbling the seeds in each of the cells of the floating trays used in such systems. FIG. 25 is a side depiction of a dibbler 340 a machine used to plant seeds in individual cells 349 of a floating tray 347. Drum 341 of Dibbler 340 has an array 345 of nipple or funnel shaped projections 343. The array of nipples 345 matches the matrix 351 of cells 349 in each tray 345. Conveyor 353 moves each tray 347 under drum 341. As tray 345 passes under drum 341 which is rotating each nipple 343 at will project into a cell 349 to implant a seed in a process called dibbling. In the present invention the oval shape of the cells with the major axis of the oval parallel to the direction the tray will move under drum 341, longitudinal axis of the tray, each of the nipples can project deeper into the cell than if they were standard circular or square cells. Depending on the type of plants being grown this could be significant. There are certain types of plants the seeds of which have pericarps and the seeds must be planted deep enough so the pericarp is removed as it sprouts and pushes up through the growth media.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A method for rapidly growing crops in a controlled environment comprising:
   a. planting a plurality of seeds in growth media, said growth media being contained in plurality of trays that float and provide access for the crops to water when floating;
   b. germinating the seeds;
   c. transferring the trays with germinated seeds to a first stage production pond filled with water to thereby float the trays on the water in the first stage production pond;
   d. moving the trays with growing crops to at least one more production pond with fresh water during the growth cycle of the crops in the trays on a time cycle that is shorter than a reproductive life cycle of potential pathogens, wherein said time cycle is about 7 days and said reproductive life cycle is longer than 7 days;
   e. providing light to the production ponds on a daily basis for the crops to grow;
   f. controlling the quality of the water while the trays are on the first stage production pond and a second stage production pond, wherein controlling the quality of water while the trays are on production ponds comprises: withdrawing water from the production ponds without completely draining the pond, filtering out particulate matter, filtering the water through Ultraviolet (UV) filtration, agitating the withdrawn water, and returning the water to the production pond;
   g. adjusting the trays or crops within the trays to prevent crowding of the growing crops if needed; and
   h. harvesting the crops when they reach maturity.

2. The method of claim 1, wherein controlling the quality of water while the trays are on the first stage production pond and the second stage production pond also comprises pasteurizing the withdrawn water and cooling the water after pasteurization before the water is returned to the production pond.

3. The method of claim 1, wherein providing light comprises maintaining ambient light with a photosynthetic photon flux density of approximately 17 mol/m$^2$/day during day light hours.

4. The method of claim 1, comprising the additional steps of:
   a. maintaining ambient air temperature around the production pond at approximately 24° C. during daylight hours and 19° C. during night hours;
   b. maintaining water temperature at 20° C. or less;
   c. maintaining $CO_2$ levels around the pond at between 400 ppm to 1600 ppm; and
   d. aerating the pond with air/oxygen.

5. The method of claim 1, wherein moving the trays to a second production pond comprises at least one of: 1) moving the trays to a separate production pond; or 2) moving the trays to a separate section of the first production pond with segregated water.

6. The method of claim 5, wherein after the trays have been transferred to a new production pond, the first production pond is drained, cleaned, and prepared for another use.

7. The method of claim 1, further comprising moving the trays to at least a third production pond on a time cycle that is shorter than a reproductive life cycle of potential pathogens of the crop being grown.

8. The method of claim 1, wherein the floating trays have a matrix of cells in which the crops grow from the germinated seeds and cells located around the periphery of the trays which are left empty during growing.

9. The method of claim 8, wherein the at least one column of the interior cells of the tray are also left empty.

10. The method of claim 8, wherein the cells comprise a liner located therein.

11. The method of claim 8, wherein said cells are conically shaped with a large opening and a small opening, wherein the large opening of the conically shaped cells are all on the top side of the trays while the small opening is on the opposite, bottom side of the trays.

12. The method of claim 8, wherein said trays have raised edges.

13. The method of claim 1, wherein water subject to pasteurization is heated to a temperature high enough to destroy pathogens.

14. The method of claim 1, wherein the water is agitated to immobilize pathogenic spores or otherwise prevent pathogenic spores from infecting the crops.

15. The method of claim 1, wherein the ponds are packed in such a way to prevent light from reaching the water surface, algal growth, biofilm buildup, or other pathogen contamination.

16. The method of claim 1, further comprising adding nutrients to the pond water, said nutrients are maintained such that electrical conductivity (EC) levels range between 800 and 2500 mS/cm over the background level of salt and pH is between 5.5 and 7.

17. The method of claim 1, wherein after harvesting growth media and left-over plant material is processed and then sold, repurposed, or reused in production.

18. The method of claim 1, further comprising maintaining humidity levels during growth cycle of 75% or less.

* * * * *